United States Patent
De-Thomasis et al.

(10) Patent No.: US 11,415,432 B2
(45) Date of Patent: Aug. 16, 2022

(54) STATIONARY STATE DETERMINATION, SPEED MEASUREMENTS

(71) Applicant: Thales Canada Inc, Toronto (CA)

(72) Inventors: Marco De-Thomasis, Toronto (CA); Alon Green, Toronto (CA)

(73) Assignee: THALES CANADA INC., Toronto (CA)

(*) Notice: Subject to any disclaimer, the term of this patent is extended or adjusted under 35 U.S.C. 154(b) by 180 days.

(21) Appl. No.: 16/577,315

(22) Filed: Sep. 20, 2019

(65) Prior Publication Data
US 2020/0096362 A1 Mar. 26, 2020

Related U.S. Application Data

(60) Provisional application No. 62/733,939, filed on Sep. 20, 2018.

(51) Int. Cl.
| | |
|---|---|
| G01C 22/00 | (2006.01) |
| G01P 15/14 | (2013.01) |
| G01C 9/00 | (2006.01) |
| G01P 13/00 | (2006.01) |
| G01P 3/36 | (2006.01) |

(52) U.S. Cl.
CPC ............ *G01C 22/00* (2013.01); *G01C 9/00* (2013.01); *G01P 3/36* (2013.01); *G01P 13/00* (2013.01); *G01P 15/14* (2013.01)

(58) Field of Classification Search
CPC .. G01C 22/00; G01C 9/00; G01P 3/36; G01P 13/00; G01P 15/14
See application file for complete search history.

(56) References Cited

U.S. PATENT DOCUMENTS

| | | | |
|---|---|---|---|
| 4,063,733 A | * | 12/1977 | Benedict .............. A63B 53/007 473/313 |
| 4,590,801 A | | 5/1986 | Merhav |
| 4,697,278 A | | 9/1987 | Fleischer |

(Continued)

FOREIGN PATENT DOCUMENTS

| | | |
|---|---|---|
| CA | 3006942 A1 | 6/2017 |
| EP | 3853619 A1 | 7/2021 |

(Continued)

OTHER PUBLICATIONS

International Search Report and Written Opinion issued in corresponding International Application No. PCT/B2019/057998, dated Nov. 25, 2019, pp. 1-14, Canadian Intellectual Property Office, Quebec, Canada.

(Continued)

*Primary Examiner* — John E Breene
*Assistant Examiner* — Christine Y Liao
(74) *Attorney, Agent, or Firm* — Hauptman Ham, LLP

(57) ABSTRACT

A standalone odometry device includes an accelerometer and/or gyroscope configured to be mounted on a wheel or axle of a vehicle. A controller in communication with the accelerometer and/or gyroscope is configured to receive data from the accelerometer and/or gyroscope. The controller processes the data to determine one or more of the speed, wheel rotation direction, accumulated distance travelled, stationary status, acceleration, deceleration, wheel diameter, and grade of surface on which the wheel is in contact.

16 Claims, 9 Drawing Sheets

(56) References Cited

U.S. PATENT DOCUMENTS

| | | |
|---|---|---|
| 6,237,403 B1 | 5/2001 | Oldenettel et al. |
| 6,940,940 B2 | 9/2005 | Kranz |
| 7,032,450 B2 | 4/2006 | Lee et al. |
| 7,100,433 B2 | 9/2006 | Bluemel |
| 8,352,210 B2 | 1/2013 | Kranz |
| 9,849,880 B2 * | 12/2017 | D'Amato .............. B60W 10/04 |
| 2002/0020214 A1 * | 2/2002 | Potts ..................... G01L 5/0009 |
| | | 73/146 |
| 2005/0082911 A1 * | 4/2005 | Anwar ................ B60T 8/17616 |
| | | 303/171 |
| 2011/0066397 A1 * | 3/2011 | Kranz ................... G01C 22/02 |
| | | 702/141 |
| 2018/0237017 A1 * | 8/2018 | Leon ..................... B60W 10/02 |
| 2020/0041304 A1 * | 2/2020 | Arreaza .................. G06T 7/246 |
| 2020/0096362 A1 | 3/2020 | De-Thomasis et al. |
| 2020/0171893 A1 * | 6/2020 | Salt ..................... G01M 5/0066 |

FOREIGN PATENT DOCUMENTS

| | | |
|---|---|---|
| WO | 2004024531 A1 | 3/2004 |
| WO | 2020058941 A1 | 3/2020 |

OTHER PUBLICATIONS

Canadian Examination Report issued in corresponding Canadian Application No. 3,110,022, dated Mar. 28, 2022, pp. 1-5, Canadian Intellectual Property Office, Quebec, Canada.

European Search Report issued in corresponding European Application No. 19861659.1, dated May 17, 2022, pp. 1-7, European Patent Office, Munich, Germany.

* cited by examiner

STATIONARY STATE DETERMINATION, SPEED MEASUREMENTS

PRIORITY CLAIM

The present application claims the priority of U.S. Provisional Application No. 62/733,939, filed Sep. 20, 2018, which is incorporated herein by reference in its entirety.

BACKGROUND

Knowing the exact location of a vehicle, such as a train, is crucial to managing the movement and storage of a large number of vehicles. Vehicles experience wheel slip and wheel slide and are moved when positioning equipment is disabled.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
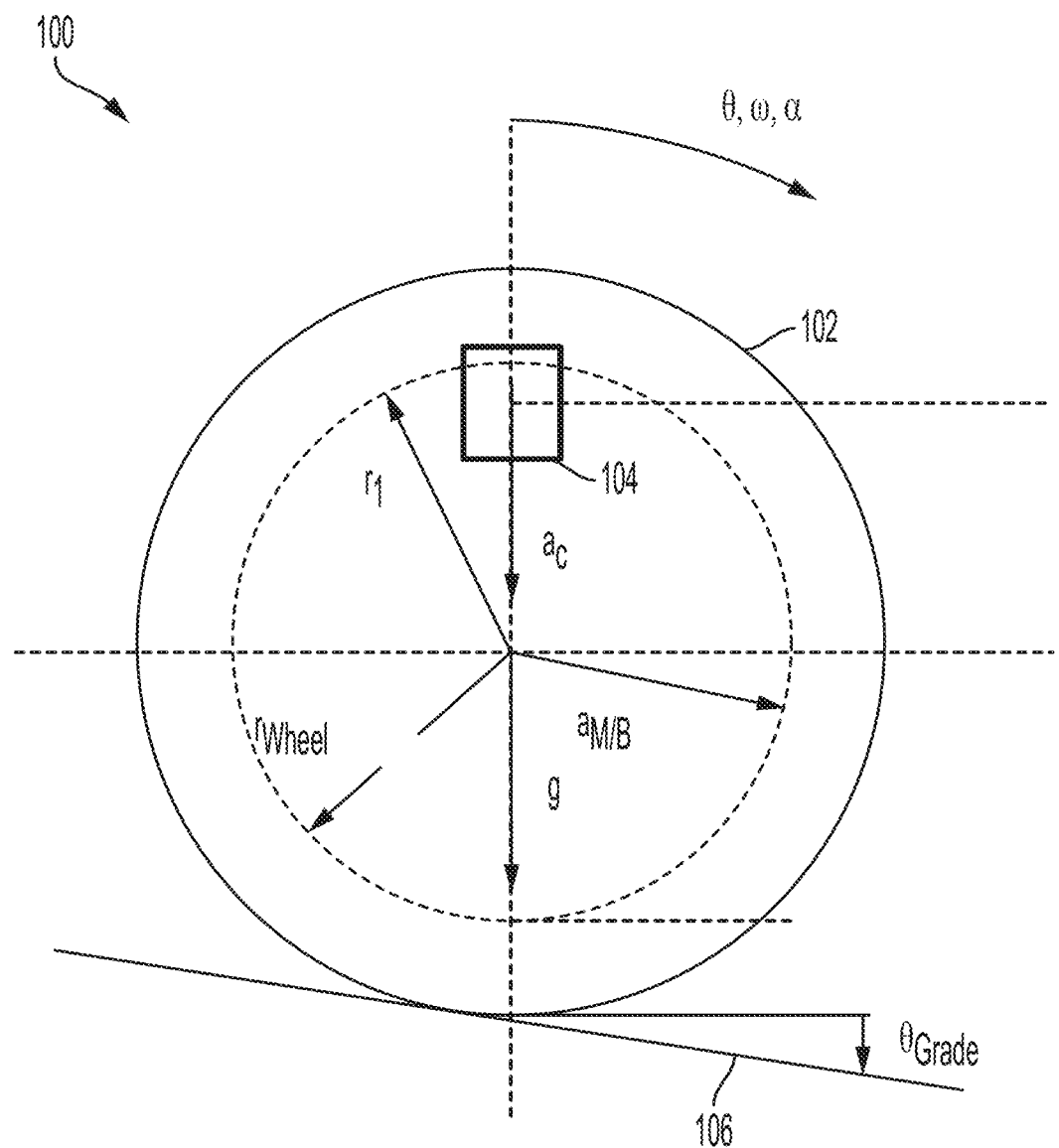
FIG. 1 is a diagram of a wheel mounted accelerometer and gyroscope configuration, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a wheel mounted accelerometer and gyroscope configuration 100, in accordance with some embodiments. An accelerometer and gyroscope 104 is attached to a wheel 102. The wheel 102 has a radius of $r_{wheel}$. The accelerometer and gyroscope 104 is attached at a distance $r_1$ from the center of wheel 102. The wheel 102 is on a track 106. The track 106 has a grade of $\theta_{Grade}$. The wheel 102 experiences gravitational force g. As the wheel 102 moves, the accelerometer and gyroscope 104 moves through angle $\theta$, at a wheel/axle angular speed $\omega$, and with a wheel/axle angular acceleration $\alpha$. The accelerometer measures the centripetal acceleration $a_c$ and the gyroscope measures the angular speed $\omega$. The wheel 102 experiences a net acceleration due to motoring & braking $a_{M/B}$, compensated for the wheel-to-rail friction and drag along the vehicle's primary axis.

Figure 2:
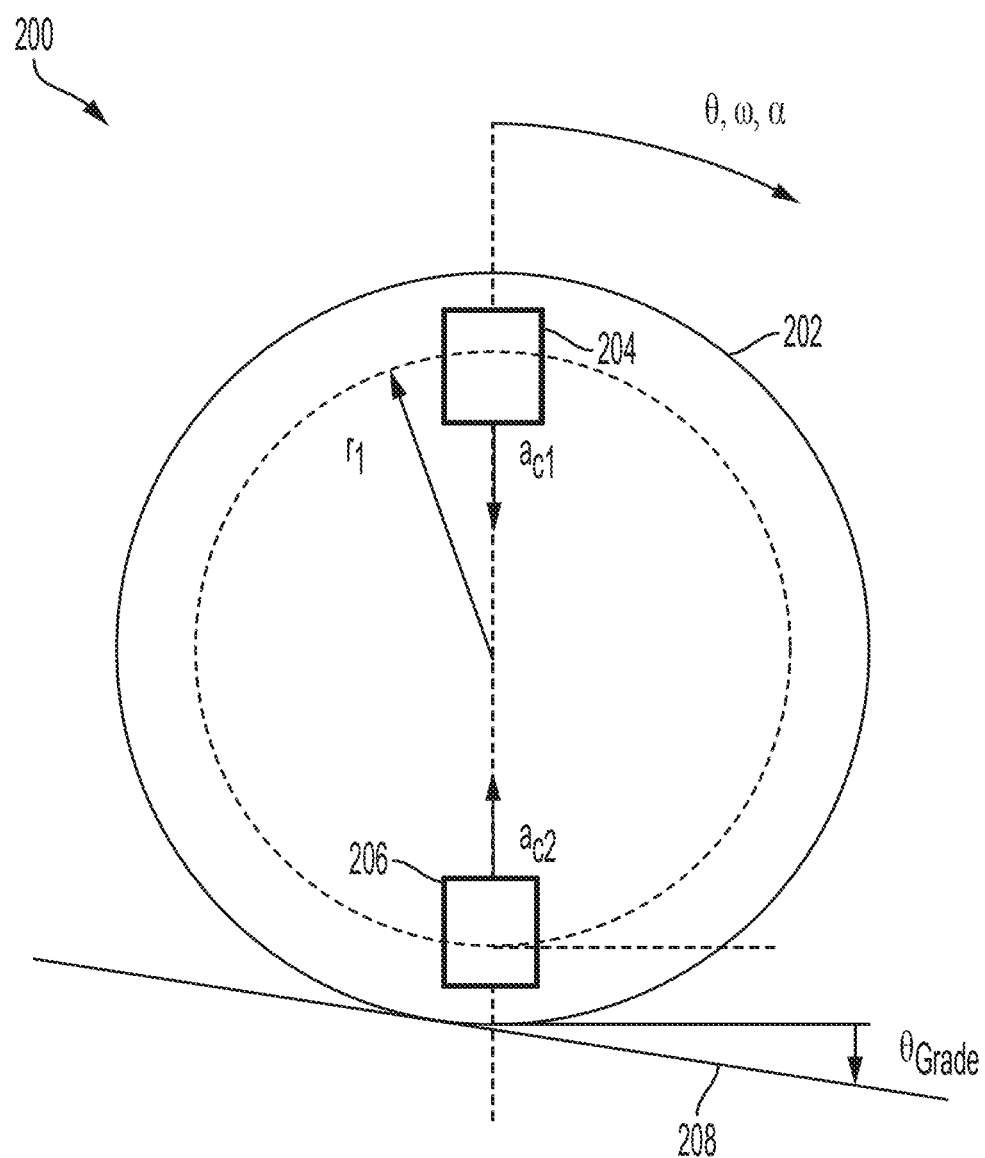
FIG. 2 is a diagram of a wheel mounted accelerometer and gyroscope configuration, in accordance with some embodiments.

FIG. 2 is a diagram of a wheel mounted accelerometer and gyroscope configuration 200, in accordance with some embodiments. A first accelerometer and gyroscope 204 is attached to a wheel 202. A second accelerometer and gyroscope 206 is attached to the wheel 202 on the opposite side of the wheel 202 from the first accelerometer and gyroscope 204. The accelerometer and gyroscopes 204 and 206 are attached at a distance $r_1$ from the center of wheel 202. The wheel 202 is on a track 208. The track 208 has a grade of $\theta_{Grade}$. As the wheel 202 moves, the accelerometer and gyroscopes 204 and 206 move through angle $\theta$, at a wheel/axle angular speed $\omega$, and with a wheel/axle angular acceleration $\alpha$. The accelerometers measure their respective centripetal accelerations $a_{c1}$ and $a_{c2}$ and the gyroscopes measure the angular speed $\omega$.

Figure 3:
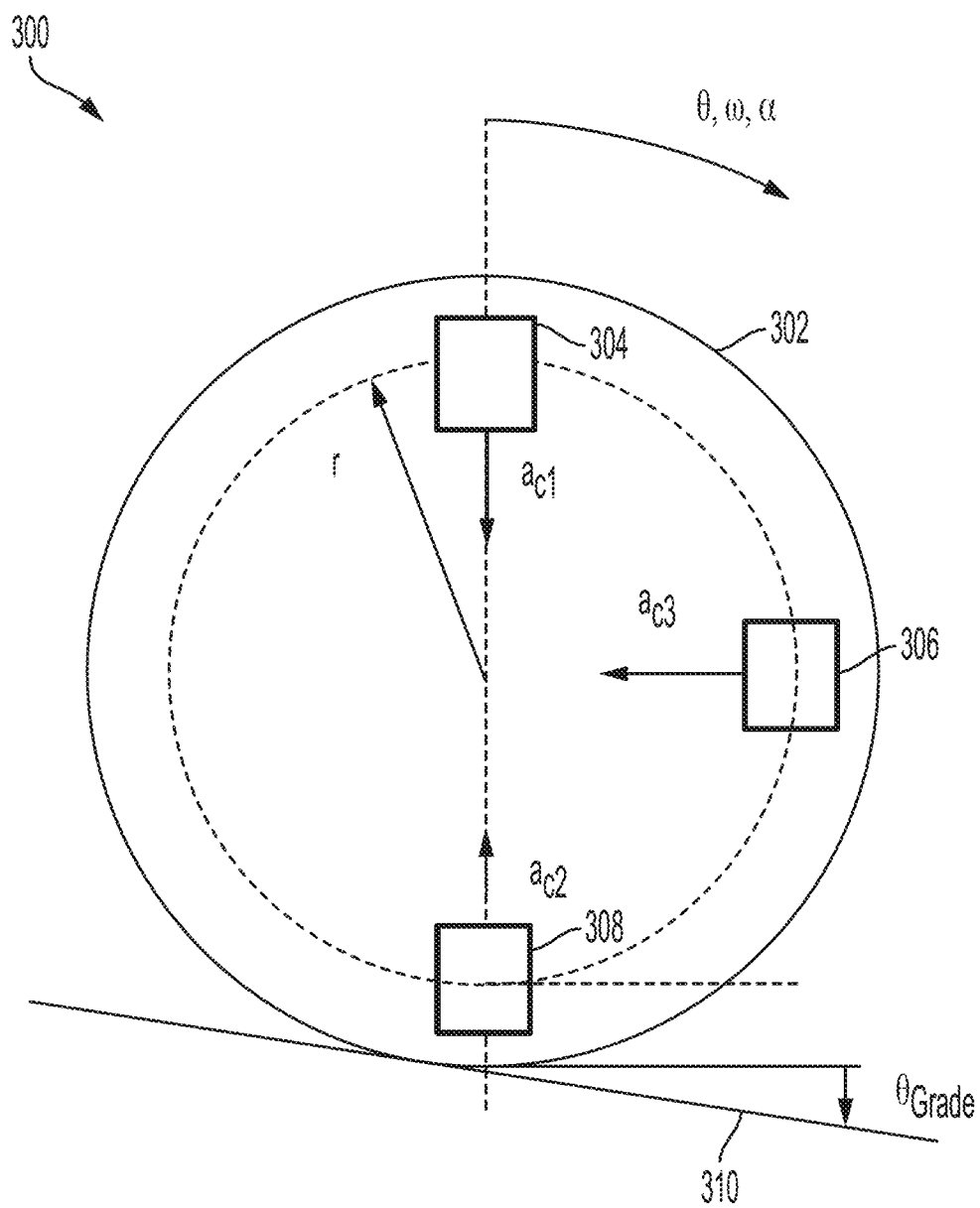
FIG. 3 is a diagram of a wheel mounted accelerometer and gyroscope configuration, in accordance with some embodiments.

FIG. 3 is a diagram of a wheel mounted accelerometer and gyroscope configuration 300, in accordance with some embodiments. Three accelerometers 304, 306 and 308 are attached to a wheel 302. A first accelerometer and gyroscope 304 is attached to the wheel 302. A second accelerometer and gyroscope 308 is attached on the opposite side of the wheel 302. A third accelerometer and gyroscope 306 is attached to the wheel 302, ninety degrees away from both the first and second accelerometer and gyroscopes 304, 308. The accelerometer and gyroscopes 304, 306 and 308 are attached at a distance r from the center of wheel 302. The wheel 302 is on a track 310. The track 310 has a grade of $\theta_{Grade}$. As the wheel 302 moves, the accelerometer and gyroscopes 304, 306 and 308 move through angle $\theta$, at a wheel/axle angular speed $\omega$, and with a wheel/axle angular acceleration $\alpha$. The accelerometers measure their respective centripetal accelerations $a_{c1}$, $a_{c2}$ and $a_{c3}$ and the gyroscopes measure the angular speed $\omega$.

Figure 5:
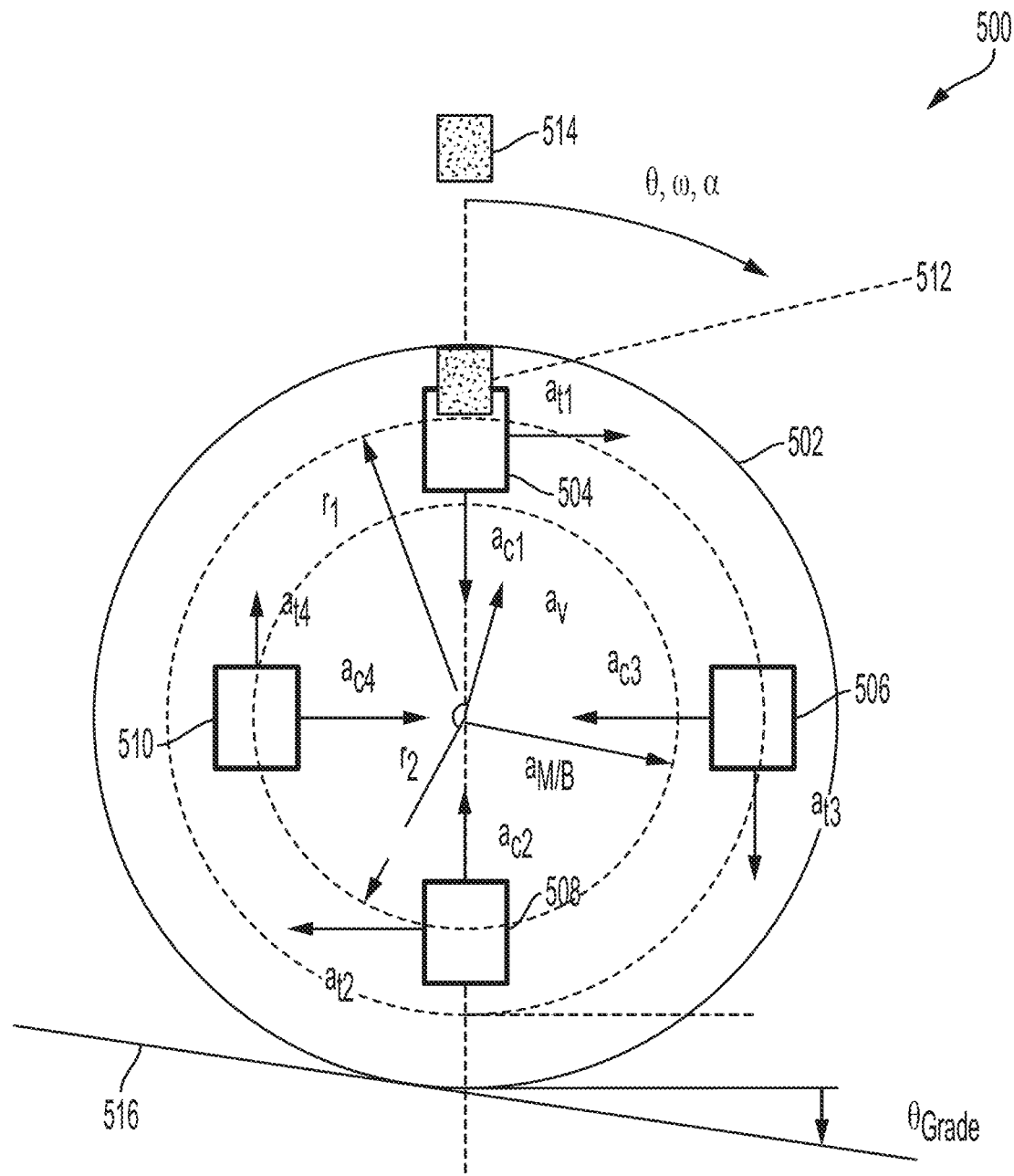
FIG. 5 is a diagram of stationary/moving state based on wheel marker position with a probe field of view, in accordance with some embodiments.

FIG. 5 is a diagram of a wheel mounted accelerometer and gyroscope configuration 500, in accordance with some embodiments. Four accelerometers and gyroscopes 504, 506, 508 and 510 are attached to a wheel 502. A first accelerometer and gyroscope 504 is attached to the wheel 502. A second accelerometer and gyroscope 506 is attached to the wheel 502. A third accelerometer and gyroscope 508 is attached to the wheel 502. A fourth accelerometer and gyroscope 510 is attached to the wheel 502. Each accelerometer and gyroscope is ninety degrees out of phase from an adjacent accelerometer and gyroscope. A marker 512 is attached to the wheel 502 near the first accelerometer and gyroscope 504. An inclinometer 514 is positioned above the wheel 502. The accelerometer and gyroscopes 504 and 506 are attached at a distance $r_1$ from the center of wheel 502. The accelerometer and gyroscopes 508 and 510 are attached at a distance $r_2$ from the center of wheel 502. The wheel 502 is on a track 510. The track 510 has a grade of $\theta_{Grade}$. As the wheel 502 moves, the accelerometer and gyroscopes 504, 506, 508 and 510 move through angle $\theta$, at a wheel/axle angular speed $\omega$, and with a wheel/axle angular acceleration $\alpha$. The accelerometers measure their respective centripetal accelerations $a_{c1}$, $a_{c2}$, $a_{c3}$ and $a_{c4}$ and the gyroscopes measure the angular speed $\omega$. The wheel 502 experiences a net acceleration due to motoring & braking $a_{M/B}$ compensated for the wheel-to-rail friction and drag along the vehicle's primary axis. The accelerometer and gyroscopes 504, 506, 508 and 510 measure the acceleration $a_v$ due to vibration, train dynamics and other sources perpendicular to the vehicle's primary axis. In normal conditions, the vehicle will experience an equal number of upward motions and downward motions, so that the net vertical acceleration is expected be, on average, zero or "zero mean".

Figure 4:
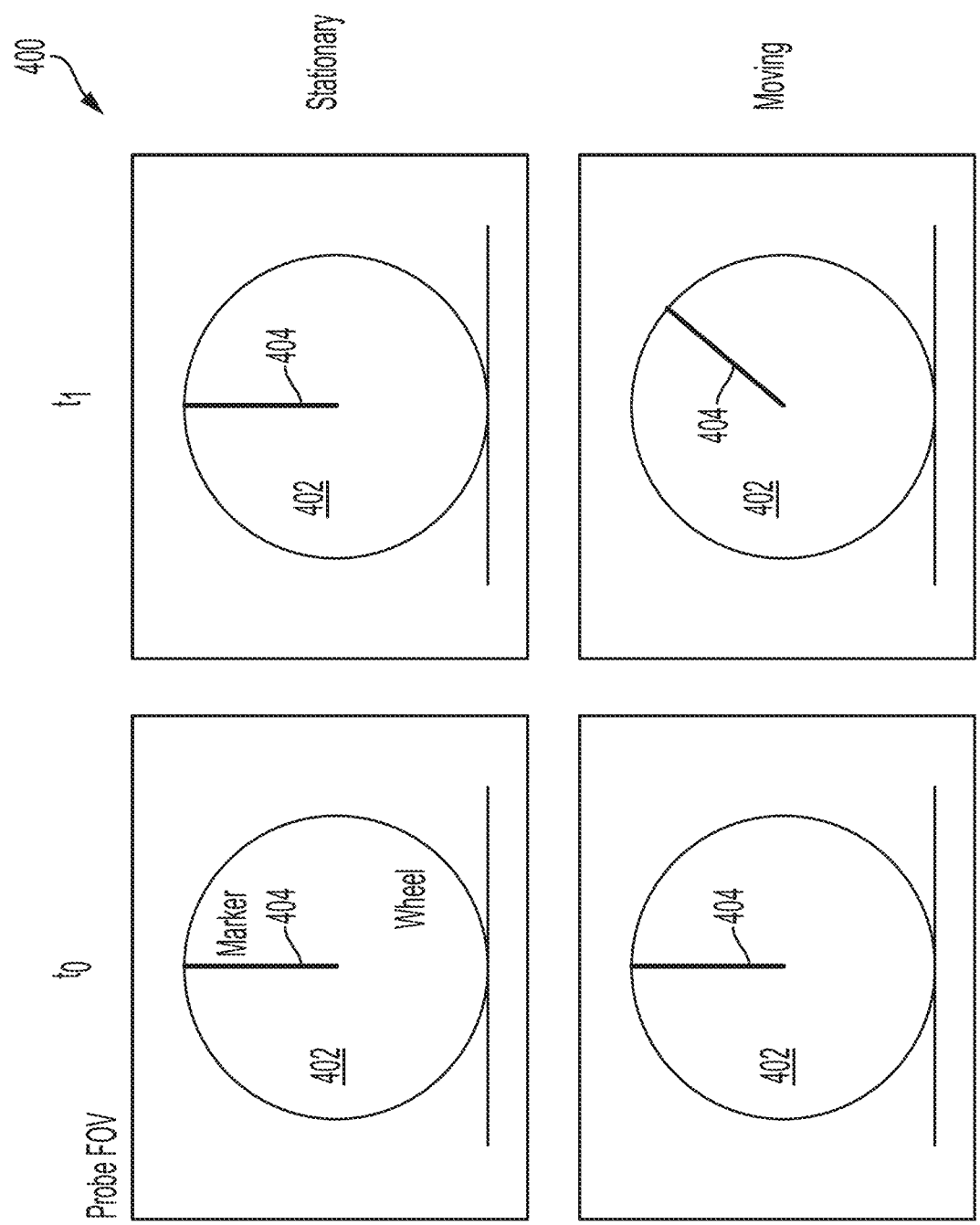
FIG. 4 is a diagram of a wheel mounted accelerometer and gyroscope configuration, in accordance with some embodiments.

FIG. 4 is a diagram 400 of stationary/moving state of a wheel, e.g., wheel 102, 202, 302, 502, based on wheel marker position with a probe field of view, in accordance with some embodiments. A wheel 402 has a marker 404 affixed, represented in the Figure by a radial line. When the wheel 402 is stationary, from time $t_1$ to $t_0$, the marker 404 does not move. When the wheel 402 is moving, from time $t_1$ to $t_0$, the marker 404 moves. With a probe, the stationary state of a vehicle can be determined with high integrity using a simple explainable measurement method.

Figure 6:
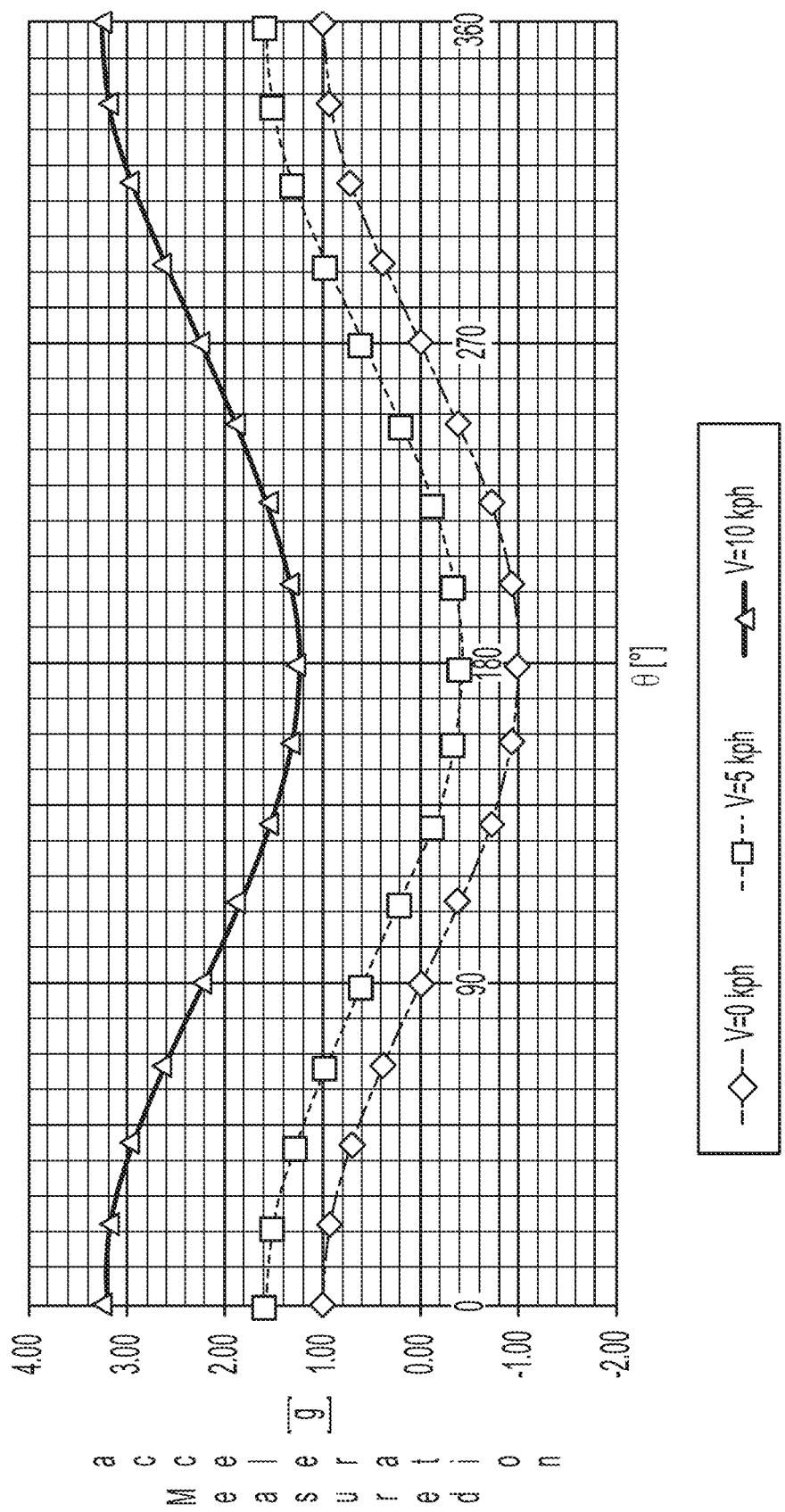
FIG. 6 is a chart of measured acceleration as a function of vehicle speed, in accordance with some embodiments.

FIG. 6 is a chart of measured acceleration as a function of vehicle speed, in accordance with some embodiments. The graph shows the measured acceleration due to gravity for speeds of V=0 kilometers per hour (kph), V=5 kph and V=10 kph. The measured acceleration has a "fixed" (as a function of the speed) component and alternating component (sinusoidal) with an amplitude of g (gravity) and frequency of $\omega$.

Figure 7:
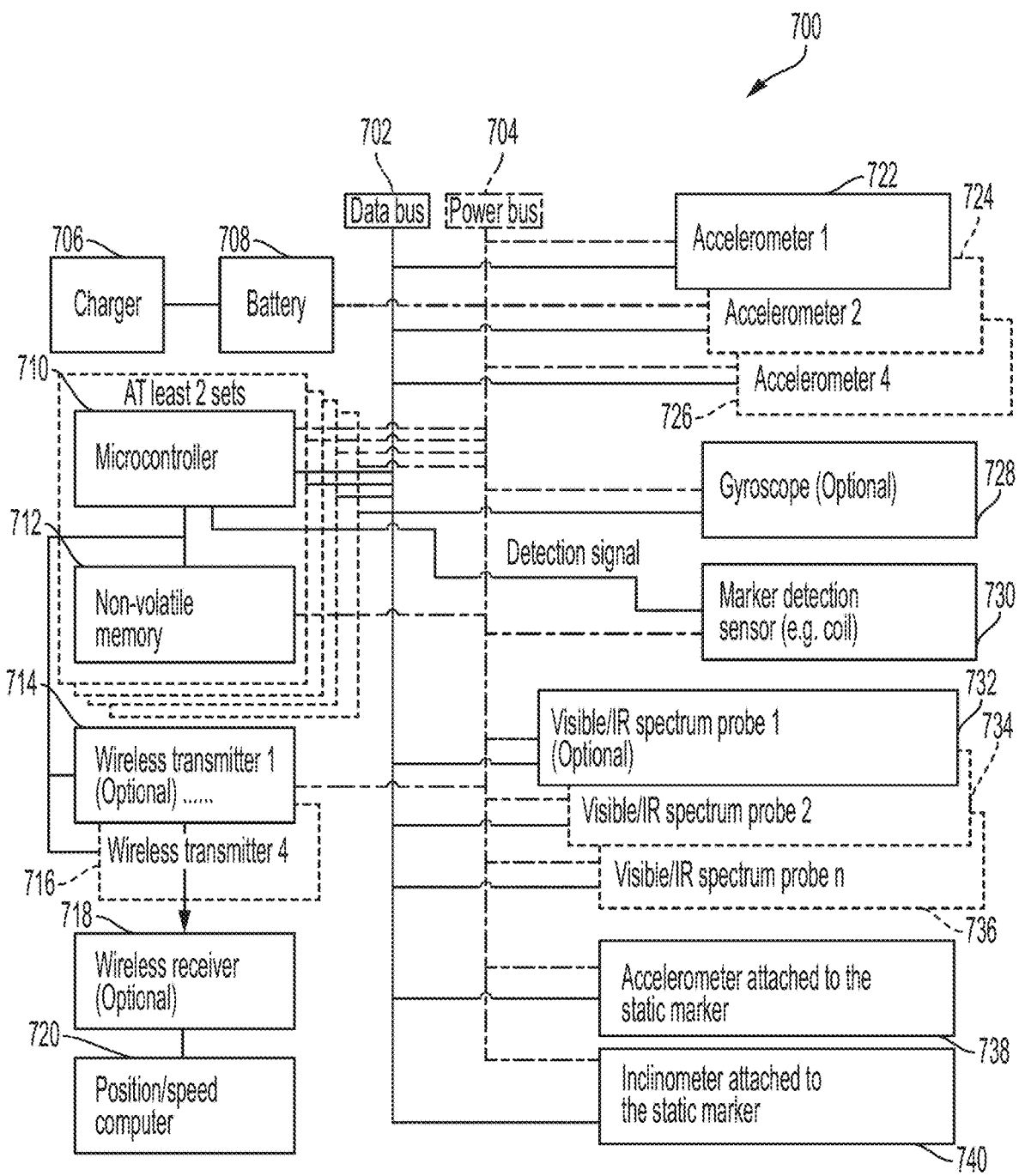
FIG. 7 is a block diagram of a system for implementing an embodiment, in accordance with some embodiments.

FIG. 7 is a block diagram of a system 700, in accordance with some embodiments. A data bus 702 and a power bus 704 are connected to the components of the system 700. The power bus 704 is connected to a battery 708 and the battery 708 is connected to a charging device 706. In some embodiments, the battery 708 is one or more other power sources. In some embodiments, the charging device 706 is an optional component.

A microcontroller 710 and associated non-volatile memory 712 are connected to the data bus 702. Wireless transmitters 714, 716 are connected to the microcontroller 710. A wireless receiver 718 is connected to the wireless transmitter 714. A position/speed computer 720 is connected to the wireless receiver 718. Accelerometers 722, 724, 726 are connected to the data bus 702. A gyroscope 728 is connected to the data bus 702. A marker detection sensor 730 is connected to the microcontroller 710 and sends a detection signal to the data bus 702 when a marker is detected. One or more visible/IR spectrum probes 732, 734, 736 are connected to the data bus. An accelerometer 738 attached to the static marker is connected to the data bus 702. An inclinometer 740 attached to the static marker is connected to the data bus 702.

A standalone odometry device includes accelerometers 722, 724, 726, 738. In one or more embodiments, the accelerometers are dual axis MEMS accelerometers and/or dual axis Piezoelectric accelerometers. In an embodiment, the odometry device includes a single pair of static marker (e.g., a magnet) and marker detection sensor 730 (e.g., a coil). In an embodiment, the odometry device includes a single dual axis MEMS accelerometer 738 attached to the static marker. In an embodiment, the odometry device includes a single inclinometer 740 attached to the static marker. In an embodiment, the odometry device includes two microcontrollers 710. In an embodiment, the odometry device includes two non-volatile memories 712. In an embodiment, the odometry device includes two batteries 708. In an embodiment, the odometry device includes a single battery charger unit 706. In an embodiment, the odometry device includes two wireless transmitters 714, 716 and/or wired links. In an embodiment, the odometry device is attached to the vehicle's wheel/axle, for example, wheels 102, 202, 302, 502, 902.

In an embodiment, four dual axis MEMS accelerometers 722, 724, 726, 738 are in 90° out of phase arrangement with respect to each other (refer to FIG. 5) with each one measuring both the centripetal acceleration ($a_c$) and tangential acceleration ($a_t$). In at least some embodiments, high accuracy of the 90° property (i.e. 1±arcminute) is required.

A marker detection sensor 730 with accuracy of 1±arcminute is installed on accelerometer 722 and a static marker is installed at the angular position of accelerometer 738 at its reference position ($\theta_0$).

In some embodiments, the static marker contains a dual axis accelerometer 738 which has its X axis aligned with the vehicle's primary axis with ±1 arcminute angular accuracy (typical), and its Y axis is perpendicular to the vehicle's primary axis with ±1 arcminute angular accuracy (typical).

The static marker contains an inclinometer 740 which has its leveled position aligned with the vehicle's primary axis with ±1 arcminute angular accuracy (typical).

In an embodiment, four dual axis Piezoelectric accelerometers 722, 724, 726, 738 are in 90° out of phase arrangement with respect to each other (refer to FIG. 5) with each one measuring both the centripetal acceleration ($a_c$) and tangential acceleration ($a_t$). In some embodiments, high accuracy of the 90° property (i.e. ±1 arcminute) is required.

The two microcontrollers 710 and their associated non-volatile memories 712 are connected to all sensors 722, 724, 726, 738, 728, 730 with each microcontroller 710 powered from an independent battery 708 or other power source. In some embodiments, high synchronization of all the accelerometers measurements and processing is required (1 μsec or better). In at least some embodiments, high bandwidth accelerometers (10 KHz or higher) are required.

The battery recharge unit 706 converts the rotational energy of the axle into electricity and charges the batteries when the axle is rotating.

The calculation of the vehicle odometry and positioning properties including speed, distance travelled, wheel diameter, grade, acceleration due to motoring and braking, or the like is performed in the digital domain with floating point arithmetic, if digitally performed, including trigonometric functions (sin, $\tan^{-1}$, etc.) or its equivalent. The calculation of the vehicle odometry and positioning properties including speed, distance travelled, wheel diameter, grade, acceleration due to motoring and braking, or the like is performed in the "analog" domain using an operational amplifier or equivalent. Special care must be taken for singular cases such as division by zero, $\tan^{-1}$ (90°), or the like to avoid exceptions "halt" situations as the proposed method is a real-time, high-accuracy system.

The sensors, including the accelerometers 722, 724, 726, 738, gyroscopes 728 and probes 732, 734, 736, are powered from a battery 708 and report their measurements to the microcontrollers 710 which timestamp the measurements, calculate the odometry outputs, log the data into the memory in FIFO manner and transmit the data to the positioning computer 720 on-board the vehicle via the wireless link 726, 718.

The microcontroller clock is synchronized with the position/speed computer clock either by network time protocol (NTP) or precision time protocol (PTP).

Before the position/speed computer 720 is intentionally shutting down or transitioning to hibernation mode the position/speed computer 720 commands the microcontroller 710 to erase its memory content. The microcontroller timestamp upon the shutdown/hibernation is stored in the position/speed computer flash memory together with the vehicle's reference position. When the position/speed computer 720 is powered up or transitions out of the hibernation mode, the computer 720 checks the records stored in the microcontroller memory to determine if the vehicle has been moved during this period.

Figure 9:
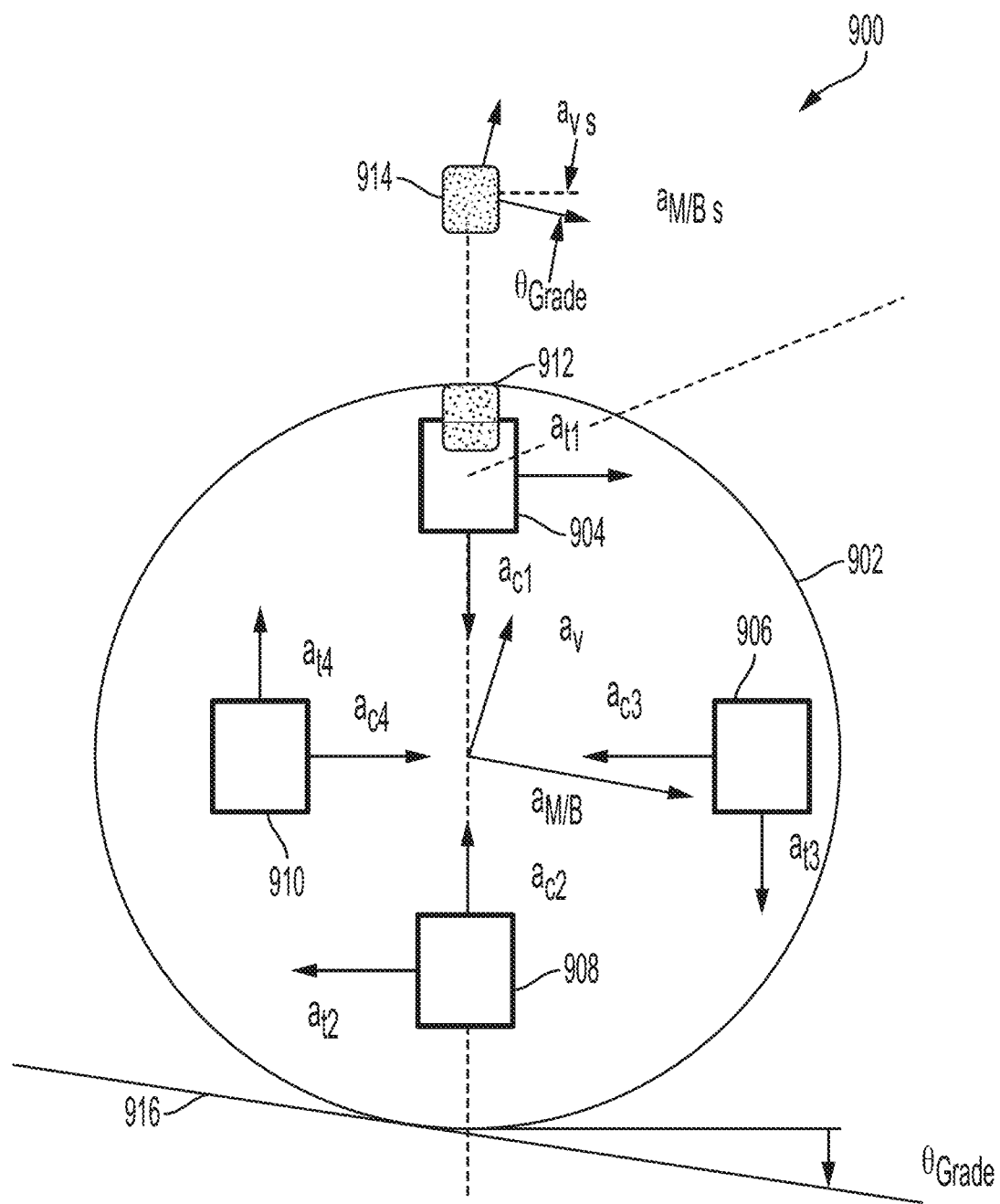
FIG. 9 is a diagram of a wheel mounted accelerometer, marker detection, and inclinometer, in accordance with some embodiments.

FIG. 9 is a diagram of a wheel-mounted accelerometer, marker detection, and inclinometer, in accordance with some embodiments. Four accelerometers and gyroscopes 904, 906, 908 and 910 are attached to a wheel 902. The first accelerometer and gyroscope 904, second accelerometer and gyroscope 906, third accelerometer and gyroscope 908 and fourth accelerometer and gyroscope 910 are attached to the wheel 902, each ninety degrees out of phase. A marker 912 is attached to the wheel 902 near the first accelerometer and gyroscope 904. An inclinometer 914 is positioned above the wheel 902. The wheel 902 is on a track 916. The track 916 has a grade of $\theta_{Grade}$. As the wheel 902 moves, the accelerometer and gyroscopes 904, 906, 908 and 910 move through angle $\theta$, at a wheel/axle angular speed $\omega$, and with a wheel/axle angular acceleration $\alpha$. The accelerometers measure their respective centripetal accelerations $a_{c1}$, $a_{c2}$, $a_{c3}$ and $a_{c4}$ and the gyroscopes measure the angular speed $\omega$. The wheel 902 experiences a net acceleration due to motoring & braking $a_{M/B}$ compensated for the wheel-to-rail friction and drag along the vehicle's primary axis. The accelerometer and gyroscopes 904, 906, 908 and 910 measure the acceleration $a_V$ due to vibration, train dynamics and other sources perpendicular to the vehicle's primary axis. In normal conditions, this acceleration is expected to be "zero mean".

The odometry method and system generates data regarding the vehicle's speed, wheel rotation direction, accumulative distance travelled, stationary status, acceleration due to motoring and braking, wheel diameter and the grade, and cold motion detection. Embodiments of the system and method generate data regarding wheel vibration monitoring, wheel diameter monitoring, guideway survey (grade) and monitoring, track & rails monitoring (e.g. "bumps", gaps, etc.), traction and braking control and wheel-rails/road adhesion monitoring.

In one or more embodiments, the odometry method and system make stationary state determinations, speed measurements, provide a dead reckoning system and a cold motion detection system with wheel/axle mount sensors.

In one or more embodiments, a wheel-mounted, self-contained and wired or wireless odometry system and method calculates the vehicle's speed, the wheel rotation direction, the vehicle's accumulative distance, the vehicle's acceleration due to motoring and braking, the grade of the track, the vehicle's stationary status, any change in the vehicle's position due to cold motion and the wheel diameter.

A system is self-contained when the system has an intrinsic power source which does not require any external measurements to determine its intended outputs.

Accumulative distance travelled is the distance travelled along the tracks/road since the system startup time.

A vehicle's stationary state is when the vehicle speed is below a certain low speed threshold (typically 0.5 kph); and the vehicle did not move more than a certain travelled distance (typically +/−3 cm).

Cold motion is vehicle motion while the main positioning/speed computer is shutoff. Cold motion can make stored position data incorrect.

Wheel spin is the rotation of a vehicle's wheel without traction. Wheel spin typically occurs during motoring while the motor provides traction power resulting in wheel rotation which does not translate into translation motion.

Wheel slide is when a vehicle's wheel rotation underestimates the vehicle's translation speed. Wheel slide typically occurs during braking while the brakes are applied resulting in slowing down the wheel rotation (angular speed) which does not translate into translation speed slow down.

Wheel lock is when the vehicle's wheel rotation is zero or near zero while the vehicle's translation speed in not impacted.

A marker 512, 912 is an element passive or active that can be detected by the marker detection sensor with high angular accuracy (typically better than 1 arcminute).

A marker detection sensor 730 is a sensor capable of detecting a marker with high angular accuracy (typically better than 1 arcminute).

In an embodiment, a single axis accelerometer and gyroscope pair such as 104 with wired or wireless transmission capability is installed on the wheel/axle of a vehicle. A probe such as 732 in the visible spectrum or the IR spectrum is oriented to monitor the wheel 102.

The accelerometer 104 measures the centripetal acceleration of the wheel and also normal, to the "local level" plane, component of the acceleration due to gravity and the motoring/braking force induced by the vehicle as shown in Equation (1).

$$a_c = \omega^2 r + g \cos(\theta_{Grade})\cos\theta - a_{M/B} \sin\theta - a_V \cos\theta \quad \text{Equation (1)}$$

$a_c$—Centripetal acceleration measured by the accelerometer.
$\omega$—Wheel/Axle angular speed.
r—The distance from the wheel/axle centre to the sensor.
g—Gravity.
$a_{M/B}$—The net acceleration due to motoring & braking (compensated for the wheel to rail friction and drag along the vehicle's primary axis.
$a_V$—The acceleration due to vibration, train dynamics and other sources perpendicular to the vehicle's primary axis. In normal conditions this acceleration is expected to be "zero mean".
$\theta$—The accelerometer angular position on the wheel/Axle.

$\theta_{Grade}$—The angular slope due to grade at the wheel-rail contact point.

Therefore, the vehicle's translation speed (V) can be expressed as shown in Equation (2).

$$V = r_{Wheel} \times \omega = r_{Wheel} \times ((a_c + a_{M/B} \sin\theta + a_V \cos\theta - g \cos(\theta_{Grade}) \cos\theta)/r)^{1/2}, \quad \text{Equation (2)}$$

where $r_{Wheel}$ is the wheel radii.

$\theta$ is a function of the wheel angular speed and time as shown in Equation (3).

$$\theta = \theta_0 + \omega t + \tfrac{1}{2}\alpha t^2 \quad \text{Equation (3)}$$

$\alpha$—Wheel/Axle angular acceleration.

If two accelerometers, such as 204, 206 in FIG. 2, are installed 180° out of phase then V can be calculated using Equation (4).

$$V = r_{Wheel} \times \omega = r_{Wheel} \times ((a_{c1} + a_{c2})/(r_1 + r_2))^{1/2} \quad \text{Equation (4)}$$

Where $r_1$ is the distance from the wheel/axle centre to a first sensor 204 and $r_2$ is the distance from the wheel/axle centre to a second sensor 206.

If a third accelerometer 306 is added in 90° out of phase to a first accelerometer 304, then the wheel rotation direction can be determined too. The wheel rotation direction is forward if a second accelerometer 308 is leading over the first accelerometer 304, otherwise the wheel rotation direction is reverse.

If a fourth accelerometer 510 is added and all four accelerometers 504, 506, 508, 510 are dual axis accelerometers measuring both the centripetal acceleration ($a_c$) and the tangential acceleration ($a_t$) then the grade ($\theta_{Grade}$), acceleration due to motoring and braking ($a_{M/B}$), angular acceleration ($\alpha$) and angular speed ($\omega$) can be determined too as shown in Equations (5) to (9) below.

Determination of grade and acceleration due to motoring and braking in Equations (6) and (7) below assume $a_V$ is approximately zero.

$$a_t = \alpha r + g \cos(\theta_{Grade})\sin\theta + a_{M/B}\cos\theta - a_V\sin\theta \quad \text{Equation (5)}$$

$$\theta_{Grade} = \cos^{-1}(A\cos\theta + B)/(g(\sin\theta + \cos^2\theta)), \quad \text{Equation (6)}$$

where $$A = (r_2(a_{c1} + a_{t3}) - r_1(a_{c2} + a_{t1} + a_{t2} - a_{t3}))/(2(r_1 + r_2))$$

$$B = (r_2(a_{t1} - a_{c3}) - r_1(a_{t2} + a_{c3} - a_{c1} - a_{c2}))/(2(r_1 + r_2)),$$

or alternatively $$\theta'_{Grade} = \cos^{-1}(A'\cos\theta + B')/(g(\sin\theta + \cos^2\theta)),$$

where $$A' = (r_2(a_{c1} + a_{t3}) - r_1(a_{c3} + a_{c4} + a_{t2} - a_{t3}))/(2(r_1 + r_2))$$

$$B' = (r_2(a_{t3} - a_{c3}) - r_1(a_{t3} + a_{t4} - a_{t1} - a_{c4}))/(2(r_1 + r_2))$$

$$a_{M/B} = g \cos\theta_{Grade} \cos\theta - A, \quad \text{Equation (7)}$$

or alternatively $$a'_{M/B} = g \cos\theta'_{Grade} \cos\theta - A'$$

$$\alpha = (a_{t1} + a_{t2})/(r_1 + r_2) = (a_{t3} + a_{t4})/(r_1 + r_2) \quad \text{Equation (8)}$$

$$\omega^2 = (a_{c1} + a_{c2})/(r_1 + r_2) = (a_{c3} + a_{c4})/(r_1 + r_2) \quad \text{Equation (9)}$$

Vertical acceleration $a_V$ (typically results from vibration, noise, vehicle's dynamics, etc.) requires estimation in order to achieve accurate $\theta_{Grade}$. The noise of the acceleration along the vehicle's primary axis has no influence on the determination of $\theta_{Grade}$ according to the propose method. To accurately determine the acceleration due motoring and braking, both $a_V$ and the noise of the acceleration along the vehicle's primary axis must be estimated.

The wheel rotation direction is forward if $\alpha$ and $\omega$ are positive, otherwise it is reverse. The gyroscope 728 measures the wheel/axle angular speed. The wheel rotation direction is forward if $\omega_{Gyro}$ is positive, otherwise it is reverse.

To resolve Equation (6) and (7) above, the angular position of the first accelerometer 104, 204, 304, 504, 904 needs initialization. Then, the angular position is calculated as shown in Equation (3) above.

Even though the calculation of $\theta$ is done via integration which may drift over time due to small error (bias) integration of long period of time, this error is contained due to the fact that the error is reset every wheel/axle revolution by using another method indicating when the first accelerometer 104, 204, 304, 504, 904 is in the $\theta = \theta_0$ angular position. This method may include, but is not limited to, a pair of static marker 512 and a sensor 730 detecting the static marker with an angular accuracy typically better than 1 arc minute. For example, a static proximity sensor paired with another proximity sensor attached to the first accelerometer 104, 204, 304, 504, 904, or a static magnet and a coil attached to the first accelerometer 104, 204, 304, 504, 904.

The linear acceleration due to motoring and braking ($a_{M/B}$) plus the gravity component due to grade along the vehicle's primary ($g \sin\theta_{Grade}$) axis are equal to the product of the wheel diameter ($r_{Wheel}$) and the wheel/axle angular acceleration ($\alpha$).

$$a_{M/B} + g \sin\theta_{Grade} = r_{Wheel}\alpha \quad \text{Equation (10)}$$

Therefore, the wheel diameter can be determined when the non-zero angular acceleration exist ($\alpha > 5°/\text{sec}^2$ or $\alpha < -5°/\text{sec}^2$). In this case the wheel diameter is determined as shown in the Equation below.

$$r_{Wheel} = (a_{M/B} + g \sin\theta_{Grade})/\alpha \quad \text{Equation (11)}$$

In case of the angular acceleration is "zero" ($\alpha \leq 5°/\text{sec}^2$ and $\alpha \geq -5°/\text{sec}^2$) then the last valid wheel diameter calculated by Equation (11) above will be used without any change until non-zero angular acceleration occurs again.

Therefore Equation (4) above can be solved without calibration of the wheel diameter based on external (to the odometry system) measurements removing the limitation of current wheel mounted sensors technologies. i.e. calibrating the wheel diameter based on known distance between two landmarks or manual calibration by the maintainer/operator.

The accumulative distance travelled (d) is determined as shown in Equation (12).

$$d = \Sigma V \times \Delta t \quad \text{Equation (12)}$$

An alternative method to determine the accumulative distance travelled is described below. Instead of calculating the accumulative distance travelled based on the integration of the speed over time as shown in Equation (12) above, the accumulative distance travelled is calculated based on the number of wheel/axle complete (full) revolutions counted plus the angular position of the wheel/axle in the current revolution.

$$d = n 2\pi r_{Wheel} + ((\theta - \theta_0)\pi r_{Wheel}/180) \quad \text{Equation (13)}$$

$$n = \text{integer}((\theta - \theta_0)/360) \quad \text{Equation (14)}$$

$$\theta_0 = \theta \text{ at startup} \quad \text{Equation (15)}$$

The proposed method is capable to detect and compensate for wheel spin and slide without additional measurement/information from any other sensor.

In the case the state is stationary, motoring is applied and the wheel, e.g., wheel 102, 202, 302, 502, is spinning, the wheel's angular speed will be "non-zero" and therefore based on equation (4) "non-zero" translation speed will be determined. However, the acceleration due to motoring and braking based on Equation (7) above will be "zero" (i.e. $-a_{M/B\ Spin} < a_{M/B} < +a_{M/B\ Spin}$) which indicated that the wheel, e.g., wheel 102, 202, 302, 502, is rotating but no translation motion occurs.

$a_{M/B\ Spin}$ is the threshold for the acceleration due to motoring and braking during spin in the transition from stationary state to the non-stationary state due to motoring. Typical value is 0.05 m/sec².

If the current state is the stationary state spin state will be determined if the speed determined based on Equation (4) above and the speed determined based on the integration of $a_{M/B}$ plus the gravity component along the vehicle's primary axis over time ($V_{Before\ Spin} + \Sigma(a_{M/B} + g \sin \theta_{Grade}) \Delta t$) do not match as shown in the Equation below.

$$\text{Absolute}(\omega r_{Wheel} - (V_{Before\ Spin} + \Sigma(a_{M/B} + g \sin \theta_{Grade}) \Delta t)) > V_{Spin\ Threshold} \quad \text{Equation (16)}$$

Typical value for $V_{Spin\ Threshold}$ is 2 kph.

In the case the state is non-stationary, and either motoring or braking is applied and the wheel, e.g., wheel 102, 202, 302, 502, is either spinning or sliding, the translation speed based on equation (4) above will not match with the speed determined based on the integration of $a_{M/B}$ plus the gravity component along the vehicle's primary axis over time ($V_{Before\ Spin/Slide} + \Sigma(a_{M/B} + g \sin \theta_{Grade}) \Delta t$) as shown in Equation (15) above with $V_{Before\ Spin}$ replaced with $V_{Before\ Spin/Slide}$. Then spin/slide state will be determined by the proposed method.

In the spin or spin/slide state the speed determined based on Equation (4) above and the distance travelled determined based on Equation (12) and/or Equations (13) to (15) above cannot be trusted resulting in the speed and distance travelled determined as shown below.

$$V = V_{Before\ Spin/Slide} + \Sigma(a_{M/B} + g \sin \theta_{Grade}) \Delta t \quad \text{Equation (17)}$$

$$d = \Sigma V_{Before\ Spin/Slide} \Delta t + \tfrac{1}{2} \Sigma(a_{M/B} + g \sin \theta_{Grade}) \Delta t^2 \quad \text{Equation (18)}$$

The check of Equation (16) will continuously performed to determine if the spin or slide condition is ceased resulting in the transition to the non-spin/slide state if the conditions in the Equation below are satisfied.

$$\text{Absolute}(\omega r_{Wheel} - (V_{Before\ Spin/Slide} + \Sigma(a_{M/B} + g \sin \theta_{Grade}) \Delta t)) \leq V_{Spin\ Threshold} \quad \text{Equation (19)}$$

Figure 8:
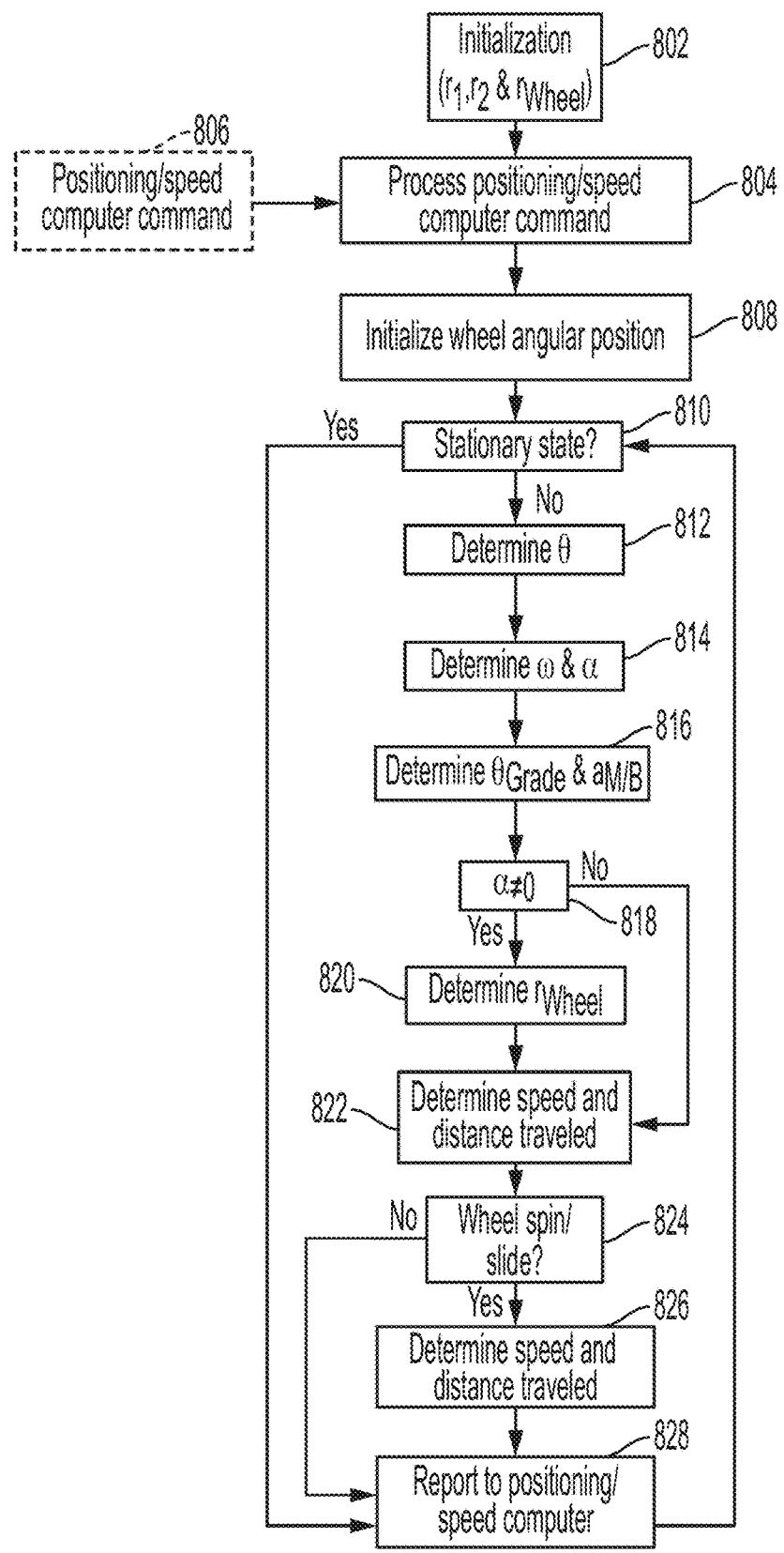
FIG. 8 is a flow chart of a method, in accordance with some embodiments.

FIG. 8 is a flow chart of a method, executed by a microcontroller, such as 710, in accordance with some embodiments. When the process is initialized, the radius of the wheel $r_{Wheel}$ and the distances from the center of the wheel to the accelerometers $r_1$, $r_2$ are defined and stored in step 802. A positioning/speed computer command 806, for example, requesting data about the position and speed of the vehicle, is processed in step 804. The wheel's initial angular position is detected (also referred to as registered) and stored using, for example, a probe or a marker, in step 808. A stationary state is determined, for example, using data from an accelerometer 722, gyroscope 728, a marker detection sensor, such as 730 or a visual/IR probe 732, in step 810. If the state of the wheel is stationary, the state is reported to the positioning/speed computer at step 828. If the state of the wheel is not stationary, the wheel angle θ is determined at step 812. The wheel/axle angular speed ω and the angular acceleration α are determined at step 814. The angle of grade $\theta_{Grade}$ and the net acceleration due to motoring and braking $a_{M/B}$ are determined at step 816. The angular acceleration is compared to zero at step 818. If the angular acceleration is non-zero, the radius of the wheel is determined, for example calculated using the net acceleration due to motoring and braking and the grade as in Equation (11), at step 820. The speed and distance travelled is determined, for example by using Equation (2) and Equation (12) at step 822. Wheel spin/slide is determined, for example calculated using the net acceleration due to motoring and braking and the grade as in equation (16), at step 824. If there is wheel spin/slide, the speed and distance travelled is determined, for example calculated using the net acceleration due to motoring and braking and the grade as in Equation (17) and (18), at step 826. The data is reported to the positioning/speed computer at step 828.

By observing a dedicated marker, e.g. markers 512, 912 (or markers) on the wheel, e.g., wheel 102, 202, 302, 502, the visible or IR spectrum probe 732 is capable to determine if the wheel, e.g., wheel 102, 202, 302, 502, 902 is rotating or not.

If the marker position within the probe's FOV does not change the wheel is not rotating (refer to FIG. 4), otherwise the wheel is rotating. The angular speed of the wheel can be determined by the frequency the marker or markers are observed.

For example, if only single marker is marked on the wheel and the marker is observed at 1 Hz, then the angular speed of the wheel is 360°/sec.

The accelerometers, for example 722, 724, 726, 738 and gyroscopes 728 send their measurements to a microcontroller 710 (or microcontrollers) which determines the speed of the vehicle, the wheel rotation direction, the accumulative distance travelled, the acceleration due to motoring and braking, the vehicle's stationary status, the grade of the ground or track, the wheel spin/slide state and any cold motion of the vehicle. In an embodiment, the microcontroller 710 or microcontrollers transfer this data to the positioning/speed computer 720 via a wired or wireless link 716, 718.

The wired or wireless link 716, 718 communicates with microcontroller 710. The microcontroller 710 has non-volatile memory 712 and stores the accelerometer's 722, 724, 726, 738 and gyroscope's 728 output with a timestamp together with their associated speed, wheel rotation direction, stationary status, grade, etc. If during the period the positioning/speed computer 720 is shutoff and the vehicle did move the motion will be recorded in terms of angular speed and/or acceleration indicating to the positioning/speed computer 720 (when powered up) that cold motion did occur.

In one or more embodiments, the odometry method and system determines the vehicle's speed, wheel rotation direction, accumulative distance travelled, stationary status, acceleration due to motoring and braking, wheel diameter and the grade. The wheel/axle 102, 202, 302, 502, 902 is equipped with a set of four dual axis accelerometers, such as 722, 724, 726, 738 in 90° out of phase arrangement. Gyroscope 728 may be added to improve the integrity of the stationary status determination.

By using the four wheel/axle mounted dual axis accelerometers 722, 724, 726, 738 in 90° out of phase arrangement the vehicle's speed, wheel rotation direction, accumulative distance travelled, stationary status, acceleration due to motoring and braking, wheel diameter and the grade can be independently determined four (4) times by using the following arrangement in Equations (4) to (9) above.

$$a_{c1}'=a_{c1}, a_{c2}'=a_{c2}, a_{t3}'=a_{t3} \text{ and } a_{t4}'=a_{t4}.$$

$$a_{c1}'=a_{c3}, a_{c2}'=a_{c4}, a_{t3}'=a_{t2} \text{ and } a_{t4}'=a_{t1}.$$

$$a_{c1}'=a_{c2}, a_{c2}'=a_{c1}, a_{t3}'=a_{t4} \text{ and } a_{t4}'=a_{t3}.$$

$$a_{c1}'=a_{c4}, a_{c2}'=a_{c3}, a_{t3}'=a_{t1} \text{ and } a_{t4}'=a_{t2}.$$

Where $a_{c1}'$, $a_{c2}'$, $a_{t3}'$ and $a_{t4}'$ are the values plugged in into Equations (4), (6), (7), (8) & (9) above.

In an embodiment, a standalone odometry method includes four dual axis accelerometers 722, 724, 726, 738 in 90° out of phase arrangement (refer to FIG. 5) are used to determine the vehicle's speed, wheel rotation direction, accumulative distance travelled, stationary status, acceleration due to motoring and braking, wheel diameter and the grade (only if stationary status is determined) by Equations (4) to (13) above.

If the vehicle is stationary then $\omega_{Gyro}$ will be zero within a certain predefined tolerance (typically ±25°/sec) and the accelerations measured by the four (4) accelerometers 722, 724, 726, 738 do not change over time except noise generated by the vehicle's vibration or vibrations generated by passengers walking inside the vehicle.

Using the visible spectrum/IR probe 732, in an embodiment, the stationary status can be determined by analyzing the marker position within the probe's FOV. If the marker position does not change the vehicle is stationary, otherwise the vehicle is in motion. The frequency the same marker is detected determines the angular speed the wheel is rotating ($\omega_{Wheel} = f_{Marker} \times 360°/\text{revolution}$).

Cold motion detection includes a sensor 722, 724, 726, 738 or sensors, connected to a microcontroller 710 which is battery 708 powered and can be recharged when the wheel/axle is rotating. The acceleration and angular speed are logged locally even though the positioning/speed computer 720 is not powered on and therefore cold motion can be detected.

A configuration file contains stored parameters. In an embodiment, the radii (from the axle's centre) for accelerometers 1 and 3 ($r_1$ in FIG. 5) is 8 cm assuming the axle radii is 7.5 cm. The radii (from the axle's centre) for accelerometers 2 and 4 ($r_2$ in FIG. 5) is 12 cm assuming the axle radii is 7.5 cm. A typical value for the wheel radii is 35 cm.

The angular position ($\theta$) is initialized when the marker detection sensor 730 attached to accelerometer detects the static marker 512, 912.

The vehicle's stationary state is determined if all of the following conditions are satisfied:

The system state is non-spin/slide.

$$\text{Absolute}(a_{c1}+a_{c2}) < 0.05 \text{ m/sec}^2.$$

$$\text{Absolute}(a_{c3}+a_{c4}) < 0.05 \text{ m/sec}^2.$$

$$\text{Absolute}(a_{t1}+a_{t2}) < 0.05 \text{ m/sec}^2.$$

$$\text{Absolute}(a_{t3}+a_{t4}) < 0.05 \text{ m/sec}^2.$$

For at least 3 out of the 4 accelerometers the change in the measured tangential acceleration ($a_{t1}$, $a_{t2}$, $a_{t3}$ and $a_{t4}$) is bounded within ±0.05 m/sec².

For at least 3 out of the 4 accelerometers the change in the measured centripetal acceleration ($a_{c1}$, $a_{c2}$, $a_{c3}$ and $a_{c4}$) is bounded within ±0.05 m/sec².

The absolute value of the gyroscope's measured angular speed ($\omega$) is less than 5°/sec.

The absolute value of the difference between (a) the angular speed measured by the gyroscope, and (b) the angular speed calculated by accelerometers 1 & 2 ($((a_{c1}+a_{c2})/(r_1+r_2))^{1/2}$, is less than 10°/sec.

The absolute value of the difference between (a) the angular speed measured by the gyroscope, and (b) the angular speed calculated by accelerometers 3 & 4 ($((a_{c3}+a_{c4})/(r_1+r_2))^{1/2}$, is less than 10°/sec.

The absolute value of the difference between (a) the angular acceleration measured by the angular acceleration sensor, and (b) the angular acceleration calculated by accelerometers 1 & 2 $(a_{t1}+a_{t2})/(r_1+r_2)$, is less than 5°/sec².

The absolute value of the difference between (a) the angular acceleration measured by the angular acceleration sensor, and (b) the angular acceleration calculated by accelerometers 3 & 4 $(a_{t3}+a_{t4})/(r_1+r_2)$, is less than 5°/sec².

In the proposed method, the system will compare the angular speed determined by:

$$\omega^2{}_{12}=((a_{c1}+a_{c2})/(r_1+r_2))^{1/2}$$

$$\omega^2{}_{34}=((a_{c3}+a_{c4})/(r_1+r_2))^{1/2}$$

Only if $\omega_{12}$ and $\omega_{34}$ matches within a certain predefined tolerance (typically 25°/sec) the system will determine the angular speed to the average of $\omega_{12}$ and $\omega_{34}$, otherwise an alarm is raised.

The odometry system compares the two grades determined by Equation (6) above ($\theta_{Grade}$ and $\theta_{Grade}$):

$$\alpha_{12}=(a_{t1}+a_{t2})/(r_1+r_2)$$

$$\alpha_{34}=(a_{t3}+a_{t4})/(r_1+r_2)$$

In an embodiment, only if $\alpha_{12}$ and $\alpha_{34}$ matches within a certain predefined tolerance (typically 5°/sec²) the odometry system determines the angular acceleration to the average of $\alpha_{12}$ and $\alpha_{34}$, otherwise an alarm is raised.

The odometry system determines the angular position ($\theta$) to $\theta=\theta_0+\omega t+\frac{1}{2}\alpha t^2$. When the marker detection sensor 730 attached to the first accelerometer 504, 904 detects the static marker 512, 912 the odometry system will determine $\theta$ to $\theta_0$. The odometry method and system compares the two grades determined by Equation (6) above ($\theta_{Grade}$ and $\theta'_{Grade}$).

In an embodiment, only if $\theta_{Grade}$ and $\theta'_{Grade}$ matches within a certain predefined tolerance (typically 10 arc-minutes) the system will determine the grade to the average of $\theta_{Grade}$ and $\theta'_{Grade}$, otherwise an alarm is raised.

In certain conditions typically associated with noisy acceleration environment the calculation of $\theta_{Grade}$ may not be accurate enough. In this cases or if $\theta_{Grade}$ and $\theta'_{Grade}$ do not match $\theta_{Grade}$ will be determined by an independent sensor, such as inclinometer 740 which is not rotating with the wheel/axle and its leveled position is aligned with the vehicle's primary axis.

The odometry method and system compares the accelerations due to motoring and braking ($a_{M/B}$ and $a'_{M/B}$) determined by Equation (7) above.

In an embodiment, only if $a_{M/B}$ and $a'_{M/B}$ matches within a certain predefined tolerance (typically 0.05 m/sec²) the system will determine the acceleration due to motoring and braking to the average of $a_{M/B}$ and a'M/B, otherwise an alarm is raised.

If the odometry system is initialized while the angular acceleration is "zero" (and therefore the wheel radii cannot be determined) the default wheel radii will be used to determine the speed, otherwise the system will determine the wheel radii to:

$$r_{Wheel}=(a_{M/B}+g \sin \theta_{Grade})/\alpha$$

When the odometry system transitions from the stationary state to non-stationary state the system determines spin state if either of the following is fulfilled:

$$\text{Absolute}(r_{Wheel}((a_{c1}+a_{c2})/(r_1+r_2))^{1/2}) - (V_{Before\ Spin\ 12}+\Sigma(a_{M/B}+g\sin\theta_{Grade})\Delta t)) > V_{Spin\ Threshold}.$$

$$\text{Absolute}(r_{Wheel}((a_{c3}+a_{c4})/(r_1+r_2))^{1/2}) - (V_{Before\ Spin\ 34}+\Sigma(a_{M/B}+g\sin\theta_{Grade})\Delta t)) > V_{Spin\ Threshold}.$$

$V_{Before\ Spin}$ is the speed determined by accelerometers sets 1 and 2 before spin state was determined ($r_{Wheel}((a_{c1}+a_{c2})/(r_1+r_2))^{1/2}{}_{Before\ Spin}$).

$V_{Before\ Spin\ 34}$ is the speed determined by accelerometers sets 3 and 4 before spin state was determined ($r_{Wheel}((a_{c3}+a_{c4})/(r_1+r_2))^{1/2}{}_{Before\ Spin}$).

While in the spin state the odometry system will determine the speed to $V=V_{Before\ Spin}+\Sigma(a_{M/B}+g\sin\theta_{Grade})\Delta t$, and the distance travelled to $d=\Sigma V_{Before\ Spin}\Delta t+{}^{1/2}\Sigma(a_{M/B}+g\sin\theta_{Grade})\Delta t^2$.

When the odometry system transitions from the stationary state to non-stationary state the system will determine non-stationary non-spin/slide state if both of the following are fulfilled:

$$\text{Absolute}(r_{Wheel}((a_{c1}+a_{c2})/(r_1+r_2))^{1/2}) - (V_{Before\ Spin\ 12}+\Sigma(a_{M/B}+g\sin\theta_{Grade})\Delta t)) \leq V_{Spin\ Threshold}.$$

$$\text{Absolute}(r_{Wheel}((a_{c3}+a_{c4})/(r_1+r_2))^{1/2}) - (V_{Before\ Spin\ 34}+\Sigma(a_{M/B}+g\sin\theta_{Grade})\Delta t)) \leq V_{Spin\ Threshold}.$$

While in the non-stationary state the odometry system will transition to the spin/slide state if either of the following is fulfilled:

$$\text{Absolute}(r_{Wheel}((a_{c1}+a_{c2})/(r_1+r_2))^{1/2}) - (V_{Before\ Spin/Slide\ 12}+\Sigma(a_{M/B}+g\sin\theta_{Grade})\Delta t)) > V_{Spin\ Threshold}.$$

$$\text{Absolute}(r_{Wheel}((a_{c3}+a_{c4})/(r_1+r_2))^{1/2}) - (V_{Before\ Spin/Slide\ 34}+\Sigma(a_{M/B}+g\sin\theta_{Grade})\Delta t)) > V_{Spin\ Threshold}.$$

While in the spin/slide state the odometry system will determine the speed to $V=V_{Before\ spin/slide}+\Sigma(a_{M/B}+g\sin\theta_{Grade})\Delta t$, and the distance travelled to $d=d_{Before\ Spin/Slide}+\Sigma V_{Before\ Spin/Slide}\Delta t+{}^{1/2}\Sigma(a_{M/B}+g\sin\theta_{Grade})\Delta t^2$.

While in the non-stationary and non-spin/slide state the odometry system will compare the vehicle speed determined by:

$$V_{12}=r_{Wheel}((a_{c1}+a_{c2})/(r_1+r_2))^{1/2}$$

$$V_{34}=r_{Wheel}((a_{c3}+a_{c4})/(r_1+r_2))^{1/2}$$

Only if $V_{12}$ and $V_{34}$ matches within a certain predefined tolerance (typically 0.5 kph) the odometry system will determine the vehicle speed to the average of $V_{12}$ and $V_{34}$, otherwise an alarm is raised.

While in the non-stationary and non-spin/slide state the odometry system will determine the distance travelled since initialization (d) to:

$$d=n2\pi\times r_{Wheel}+((\theta-\theta_0)\pi r_{Wheel}/180)$$

n and $\theta_0$ are determined based on Equations (14) and (15) above.

While in the non-stationary and non-spin/slide state the system will compare $\Delta d(((\theta-\theta_0)\pi r_{Wheel}/180))$ with the estimated distance travelled since the last wheel/axle revolution start ($\Delta d'=\Sigma V\Delta t$ since revolution start). This check is a diversity/sanity check.

In an embodiment, only if $\Delta d$ and $\Delta d'$ matches within a certain predefined tolerance (typically 1 cm), then the odometry system determines the distance travelled since initialization to d, otherwise an alarm is raised.

Upon shutdown command from the positioning/speed computer 720 the system will log the positioning/speed computer timestamp embedded in the shutdown command together with its own timestamp.

After a shutdown command is received from the positioning/speed computer 720, the system reports the speed, wheel rotation direction, distance travelled, acceleration due to motoring and braking, grade, cold motion status and the last position/speed computer timestamp logged every TShutdown, Typically TShutdown is 10 minutes.

Upon wakeup command from the positioning/speed computer, the system reports the speed, wheel rotation direction, distance travelled, acceleration due to motoring and braking, grade and cold motion status every TReport. Typically TReport is 60 msec.

In an embodiment, the timing accuracy of the microcontroller 710 is one microsecond (1 μsec) or better, to ensure the accuracy of the dead reckoning distance travelled determined by the system.

When the system is in the non-stationary state the wheel rotation direction will be determined based on the sign of the angular speed.

In an embodiment, the wheel/axle mounted odometry method includes measurement of the centripetal and tangential acceleration at four (4) quadrants of the wheel/axle (refer to FIG. 5) using four dual axis accelerometers 722, 724, 726, 738 in 90° out of phase arrangement.

In an embodiment, the wheel/axle mounted odometry method includes determination of the initial angular position of the sensors assembly using a single pair of static marker (e.g. magnet) and marker detection sensor (e.g. coil).

In an embodiment, the wheel/axle mounted odometry method includes measurement of the acceleration along the vehicle's primary axis ($a_{M/B}$) and the acceleration perpendicular to this axis ($a_V$) with a dual axis accelerometer 738 attached to the static marker.

In an embodiment, the wheel/axle mounted odometry method includes measurement of the grade ($\theta_{Grade}$) with an inclinometer 740 attached to the static marker.

In an embodiment, the wheel/axle mounted odometry method includes measurement the angular speed of the wheel/axle using single gyroscope 728.

In an embodiment, the wheel/axle mounted odometry method includes measurement of the angular acceleration of the wheel/axle using angular acceleration measurement sensor.

The vehicle's translation speed, wheel/axle rotation direction, vehicle's accumulative distance travelled, stationary status, acceleration due to motoring and braking, wheel diameter (without relying on any external measurements) and grade are determined according to Equations (4) to (19) above.

These attributes are calculated in four (4) independent microcontrollers 710 using different arrangements in the Equations as described below.

$a_{c1}'=a_{c1}$, $a_{c2}'=a_{c2}$, $a_{t3}'=a_{t3}$ and $a_{t4}'=a_{t4}$.
$a_{c1}'=a_{c3}$, $a_{c2}'=a_{c4}$, $a_{t3}'=a_{t2}$ and $a_{t4}'=a_{t1}$.
$a_{c1}'=a_{c2}$, $a_{c2}'=a_{c1}$, $a_{t3}'=a_{t4}$ and $a_{t4}'=a_{t3}$.
$a_{c1}'=a_{c4}$, $a_{c2}'=a_{c3}$, $a_{t3}'=a_{t1}$ and $a_{t4}'=a_{t2}$.

Stationary status is determined if the centripetal acceleration and the angular speed does not change beyond specified tolerance indicating the wheel translation speed is below a certain predefined threshold and the wheel is not rotating.

The sensors 722, 724, 726, 738 are powered via a battery 708 which is recharged when the wheel/axle rotates. The microcontrollers 710 associated with the sensors 722, 724, 726, 738 will temporary store the measurements with timestamp in volatile/non-volatile memory 712 until the positioning/speed computer 720 confirms the data has been received. If the positioning/speed computer 720 is powered off and the vehicle was moved (cold motion) then when the computer 720 is powered on again it will detect the cold motion based on the reported data from the sensor.

The wheel radii, grade and the acceleration due to motoring and braking are determined by using four independent dual axis accelerometers 722, 724, 726, 738 in 90° out of phase arrangement, single pair of static marker (e.g. magnet) and marker detection sensor (e.g. coil) 730, a dual axis accelerometer 738 attached to the static marker (which its X axis must be aligned with the vehicle's primary axis to measure $a_{M/B}$ and the noise along this axis and its Y axis must be perpendicular to the vehicle's primary axis measuring the noise along this axis ($a_V$)), and an inclinometer 740 attached to the static marker.

The odometry system monitors the wheel radii against a predefined minimum or maximum value providing indication to the maintenance monitoring system that maintenance action is needed. The odometry system monitors the grade against a reference grade profile providing indication to the central control and monitoring system that track/rail condition have been changed.

The odometry system monitors the track/rail condition against a reference profile of the four centripetal and tangential accelerations measured by the four dual axis sensors arrangement providing indication to the maintenance monitoring system that track/rail condition have been changed.

The odometry system monitors the motoring and braking profile against a reference profile (required as an input to the system) providing indication to the central control and monitoring system that the expected motoring and braking profile is not adhered to.

The odometry system monitors the wheel/spin slide state providing indication to the central control and monitoring system that rail-wheel adhesion issue occurred.

The odometry system monitors the speed and accumulative distance calculated by the proposed odometry method does not rely on external measurements to calibrate the wheel diameter;

The odometry system monitors the speed and accumulative distance is calculated by the proposed odometry method under non spin/slide condition and under spin/slide condition too.

In an embodiment, the odometry method and system does not require external power source to compute and transfer its output to the positioning speed computer.

In an embodiment, the odometry method and system uses cables to transfer data to the positioning speed computer if wired solution is selected, or if wireless solution is selected no cables are used to transfer data to the positioning speed computer 720.

In an embodiment, the odometry method and system determines the wheel radii without relying on any external measurements.

In an embodiment, the odometry method and system determines the grade without relying on any external measurements.

In an embodiment, the odometry method and system determines the acceleration due to motoring and braking without relying on any external measurements.

In an embodiment, the odometry method and system detects and reports cold motion even if the position/speed computer 720 is off.

In an embodiment, the method and system alarms the maintainer if the calculated wheel radii approach the radii threshold which requires maintenance action (alarm thresholds must be set).

In an embodiment, the method and system alarms the central control office that track/rail condition have been changed (reference grade and accelerations profiles must be set).

In an embodiment, the method and system alarms the central control office that the expected motoring and braking profile is not met (reference motoring and braking profile must be set).

In an embodiment, the method and system measures the vibration/acceleration noise along the axis perpendicular to the vehicle's primary axis ($a_V$) and alarm the central control office that the vibration/acceleration noise exceeded a certain threshold (threshold must be set).

Accurate determination of the acceleration due to motoring and braking ($a_{M/B}$) and grade ($\theta_{Grade}$) relies on accurate (as much as possible) estimation of the acceleration noise both along the vehicles primary axis and perpendicular to the vehicle's primary axis ($a_V$).

In an embodiment, a dual axis accelerometer attached to the static marker measures the acceleration along the vehicle's primary axis ($a_{M/B}$) and the acceleration noise perpendicular to this axis ($a_V$).

In an embodiment, an inclinometer attached to the static marker measures the grade ($\theta_{Grade}$).

The measured $a_V$ is used, for example in Equations (6) and (7), to determine the grade ($\theta_{Grade}$) and the acceleration due to motoring and braking ($a_{M/B}$). The acceleration along the vehicle's primary axis by the accelerometer 738 attached to the static marker ($a_{M/B\_s}$) will be compared with the acceleration due to motoring and braking determined by the proposed method ($a_{M/B}$) to verify its correctness.

If using the $a_V$ from the accelerometer 738 attached to the static marker is not good enough (too much sensitivity to noise), then the grade will be determined by the inclinometer 740.

In an embodiment, the odometry system includes a set of four dual axis accelerometers 722, 724, 726, 738 which measures the centripetal and tangential accelerations of the rotating wheel/axle ($a_c$ and $a_t$) at four quadrants. The four accelerometers 722, 724, 726, 738 are configured according to FIG. 5.

In an embodiment, the odometry system includes a set of single pair of static marker (e.g. magnet) and marker detection sensor (e.g. coil) which initializes the sensors assembly angular position (essential).

In an embodiment, the odometry system includes a set of single dual axis accelerometer 738 attached to the static marker which its X axis is aligned with the vehicle's primary axis ($a_{M/B}$) and its Y axis is perpendicular to the vehicle's primary axis ($a_V$).

In an embodiment, the odometry system includes a set of single inclinometer 740 attached to the static marker.

In an embodiment, the odometry system includes a set of single gyroscope 728 which measures the angular speed of the rotating wheel/axle ($\omega$)

In an embodiment, the accelerometers 722, 724, 726, 738 and the gyroscopes 728 are MEMS technology-based sensors and/or Piezoelectric technology based sensors.

The sensors are powered from a rechargeable battery 708 and their measurements are reported to two or more independent micro controllers 710 which calculate the wheel translation speed, rotation direction, accumulative distance travelled, stationary status, acceleration due to motoring and braking, wheel diameter (without relying on any external measurements) and grade, and detects cold motion of the vehicle. These attributes are stored with a timestamp into a non-volatile memory 712 for logging and via a wired or wireless transmitter 714 transferring the data to the position/speed computer.

The four dual axis accelerometers 722, 724, 726, 738 in 90° out of phase arrangement, a single pair of static marker 512, 912 (e.g. magnet) and marker detection sensor 730 (e.g. coil), a single dual axis accelerometer attached to the static marker 738, a single inclinometer 740 attached to the static marker and a microcontroller/processor.

In an embodiment, the microcontroller/processor 710 measures the centripetal ($a_c$) and tangential ($a_t$) accelerations at four quadrants, determining the initial angular position of the sensors assembly.

In an embodiment, the microcontroller/processor 710 calculates the angular speed ($\omega$).

In an embodiment, the microcontroller/processor 710 calculates the angular acceleration ($\alpha$).

In an embodiment, the microcontroller/processor 710 determines the vehicle's speed, wheel rotation direction, accumulative distance, stationary status, grade, acceleration due to motoring braking and wheel radii by four independent processes during non-wheel-spin/slide state and during wheel spin/slide state too.

In an embodiment, the microcontroller/processor 710 provides alarm to the maintainer if wheel maintenance action is needed due to the wheel radii approaching a certain predefined threshold.

In an embodiment, the microcontroller/processor 710 provides alarm to the central control office if track conditions have been changed against an apriori defined grade and accelerations (4 centripetal and 4 tangential accelerations) profile.

In an embodiment, the microcontroller/processor 710 provides alarm to the central control office if the calculated motoring and braking acceleration does not match with the expected motoring and braking profile either defined apriori or set in real-time.

In an embodiment, the microcontroller/processor 710 provides alarm to the central control office if wheel spin or slide too frequently occurs.

In an embodiment, the microcontroller/processor 710 provides alarm to the central control office if the vibration/acceleration noise perpendicular to the vehicle's primary axis exceeds a predefined threshold.

The non-volatile memory 712 which logs the measurements and the resultant calculated outputs (speed, wheel rotation direction, accumulative distance, stationary status, wheel diameter and acceleration due to motoring and braking.)

Non-volatile memory 712 enables the collection of the measurements while the position/speed computer 720 is off to determine if cold motion had occurred during this period.

From packaging perspective, one variant of an embodiment of the present disclosure which is important is packing the proposed sensing arrangement within an existing tachometer or speed sensor housing as direct fit form and function (and more) replacement. In this way what the user's observe is the same device as the existing tachometer or speed sensor but the internal is completely different with superior capabilities over the existing tachometer (optical) or speed sensor (Hall Effect) technologies.

In an embodiment, the odometry method and system provides direct measurement of the wheel's angular position, speed and acceleration, and rotation direction.

In an embodiment, the odometry method and system provides a wheel/axle mounted self-contained odometry method for determining the vehicle's translation speed, wheel/axle rotation direction, vehicle's accumulative distance travelled, stationary status, wheel diameter (without relying on any external measurements), grade and cold motion detection based on the centripetal and tangential acceleration measured on the wheel or axle by four independent dual axis accelerometers 722, 724, 726, 738 in 90° out of phase arrangement and a pair of single static marker 512, 912 and single marker detection sensor 730.

In an embodiment, the odometry method and system provides a wheel/axle mounted self-contained odometry method for determining the vehicle's stationary status and wheel/axle rotation direction based on the wheel angular speed measured by single (1) gyroscope 728.

In an embodiment, the odometry method and system provides a wheel/axle mounted self-contained odometry method capable to determine the speed, wheel rotation direction, accumulative distance, stationary status, wheel diameter and acceleration due to motoring and braking in case the wheel/axle is spinning and/or sliding.

In an embodiment, the odometry method and system provides a wheel/axle mounted self-contained method capable to determine and monitor the grade.

In an embodiment, the odometry method and system provides a wheel/axle mounted self-contained method capable to determine and monitor the wheel radii.

In an embodiment, the odometry method and system provides a wheel/axle mounted self-contained method capable to determine and monitor the acceleration due to motoring and braking.

In an embodiment, the odometry method and system provides a wheel/axle mounted self-contained method capable to monitor the tracks/rails conditions.

In an embodiment, the odometry method and system provides a wheel/axle mounted self-contained method capable to monitor the vehicle's motoring and braking control system if motoring and braking commands are provided as an input.

In an embodiment, the odometry method and system provides a wheel/axle mounted self-contained method capable to monitor the rail-wheel adhesion.

In an embodiment, the odometry method and system provides a wheel/axle mounted self-contained stationary status determination method using visible/IR spectrum probe or probes 732, 734, 736.

In an embodiment, the odometry method and system provides a wheel/axle mounted self-contained cold motion detection method.

In an embodiment, the odometry method and system provides a safety critical wheel/axle mounted self-contained and wired or wireless odometry, dead reckoning and cold motion detection method.

In an embodiment, the odometry method and system includes an accelerometer or accelerometers (single axis or dual axis) 722, 724, 726, 738, a single pair of static marker (e.g. magnet) 512, 912 and marker detection sensor (e.g. coil) 730, single dual axis accelerometer attached to the static marker 738, single inclinometer 740 attached to the static marker 512, 912, gyroscope 728, angular accelerometer and/or visible/IR spectrum probe 732 to determine the vehicle's speed, wheel rotation direction, accumulative distance travelled, acceleration due to motoring and braking, grade, wheel radii and stationary status in non-wheel-spin/slide state and in wheel spin/slide state too.

In an embodiment, the odometry method and system logs the measurements and the calculated outputs into a non-volatile memory 712 to detect if cold motion had occurred during the period that the position/speed computer 720 was off.

In an embodiment, the odometry method and system provides alarms to the maintainer and/or the central control office that wheel maintenance action is needed.

In an embodiment, the odometry method and system provides alarms to the maintainer and/or the central control office that tracks conditions, vibration/acceleration noise, wheel-rail adhesion, and/or motoring/braking requires attention.

In an embodiment, the odometry method and system provides direct measurement of the wheel's angular position, speed and acceleration, and rotation direction.

In an embodiment, the odometry method and system provides a wheel/axle mounted self-contained odometry method for determining the vehicle's translation speed, wheel/axle rotation direction, vehicle's accumulative distance travelled, stationary status, wheel diameter (without relying on any external measurements), grade and cold motion detection based on the centripetal and tangential acceleration measured on the wheel or axle by four independent dual axis accelerometers 722, 724, 726, 738 in 90° out of phase arrangement and a pair of single static marker 512, 912 and single marker detection sensor 730.

In an embodiment, the odometry method and system provides a wheel/axle mounted self-contained odometry method determining the vehicle's stationary status and wheel/axle rotation direction based on the wheel angular speed measured by single (1) gyroscope 728.

In an embodiment, the odometry method and system provides a wheel/axle mounted self-contained odometry method capable to determine the properties listed in item (3) above in case the wheel/axle is spinning and/or sliding.

In an embodiment, the odometry method and system provides a wheel/axle mounted self-contained method capable to determine and monitor the grade.

In an embodiment, the odometry method and system provides a wheel/axle mounted self-contained method capable to determine and monitor the wheel radii.

In an embodiment, the odometry method and system provides a wheel/axle mounted self-contained method capable to determine and monitor the acceleration due to motoring and braking.

In an embodiment, the odometry method and system provides a wheel/axle mounted self-contained method capable to monitor the tracks/rails conditions.

In an embodiment, the odometry method and system provides a wheel/axle mounted self-contained method capable to monitor the vehicle's motoring and braking control system if motoring and braking commands are provided as an input.

In an embodiment, the odometry method and system provides a wheel/axle mounted self-contained method capable to monitor the rail-wheel adhesion.

In an embodiment, the odometry method and system provides a wheel/axle mounted self-contained stationary status determination method using visible/IR spectrum probe or probes 732, 734, 736.

In an embodiment, the odometry method and system provides a wheel/axle mounted self-contained cold motion detection method.

In an embodiment, the odometry method and system provides a safety critical wheel/axle mounted self-contained and wired or wireless odometry, dead reckoning and cold motion detection method.

In an embodiment, the odometry method and system includes the usage of accelerometer or accelerometers (single axis or dual axis) 722, 724, 726, 738, single pair of static marker (e.g. magnet) 512, 912 and marker detection sensor (e.g. coil) 730, single dual axis accelerometer attached to the static marker 738, single inclinometer 740 attached to the static marker 512, 912, gyroscope 728, angular accelerometer and/or visible/IR spectrum probe 732 to determine the vehicle's speed, wheel rotation direction, accumulative distance travelled, acceleration due to propulsion and braking, grade, wheel radii and stationary status in non-wheel-spin/slide state and in wheel spin/slide state too.

In an embodiment, the odometry method and system includes the logging of the measurements and the calculated outputs into a non-volatile memory 712 to detect if cold motion had occurred during the period that the position/speed computer 720 was off.

In an embodiment, the odometry method and system provides alarms to the maintainer and/or the central control office that wheel maintenance action is needed.

In an embodiment, the odometry method and system provides alarms to the maintainer and/or the central control office that tracks conditions, vibration/acceleration noise, wheel-rail adhesion, and/or motoring/braking requires attention.

In an embodiment, the odometry method and system is self-contained, acting independent of external measurements. In an embodiment, the odometry method and system provides safety critical odometry (dead reckoning) and cold motion detection method operational under non-wheel-spin/slide and wheel-spin/slide states.

In an embodiment, the odometry method and system includes odometry and cold motion detection method based on diverse low cost measurement technologies (MEMS accelerometer, Piezoelectric accelerometer, single pair of static marker (e.g. magnet) 512, 912 and marker detection sensor (e.g. coil) 730, single dual axis MEMS accelerometer attached to the static marker 738, MEMS gyroscope 728, Piezoelectric gyroscope 728 and visible/IR spectrum probe 732.

In an embodiment, the odometry method and system includes an odometry method capable to determine the wheel radii, acceleration due to motoring and braking, and the grade.

A standalone odometry device comprising four dual axis accelerometers 722, 724, 726, 738 in 90° out of phase arrangement for mounting on a wheel, e.g., wheel 102, 202, 302, 502 of a vehicle, the accelerometers for determining one or more of the speed, wheel rotation direction, accumulated distance travelled, stationary status, acceleration, deceleration, wheel diameter, and grade of surface on which the wheel is stationary; and a controller in communication with one or more of the four dual axis accelerometers 722, 724, 726, 738 and arranged to receive data from each of the four dual axis accelerometers 722, 724, 726, 738, the controller 710 configured to execute one or more equations using the received data from each of the four dual axis accelerometers 722, 724, 726, 738.

A device for determining stationary status of a vehicle. The device comprising a marker 512, 912 on a wheel, e.g., wheel 102, 202, 302, 502 of a vehicle; an electromagnetic spectrum probe 732 configured to view the marker; and a controller 710 configured to determine the wheel is stationary if the position of the marker does not change; or the angular speed at which the wheel is rotating based on the frequency of detection of the marker by the probe.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A standalone odometry device comprising:
    dual-axis accelerometers, wherein the accelerometers define an array with a first accelerometer mounted at 0°, a second accelerometer mounted at 90°, a third accelerometer mounted at 180°, and a fourth accelerometer mounted at 270°; configured for mounting on a wheel or axle of a vehicle;
    an inclinometer; and
    a controller in communication with the accelerometers and the inclinometer, the controller being configured to receive data from the accelerometers and the inclinometer, the controller processes the data to determine one or more of the acceleration due to motoring, deceleration due to braking, a self-calibrated wheel diameter, a grade of a surface with which the wheel is in contact, acceleration due to the grade, and deceleration due to the grade.

2. The device of claim 1, wherein the controller processes the data using one or more equations.

3. The device of claim 2, wherein the one or more equations comprise:

$$a_c = \omega^2 r + g \cos\theta_{Grade} \cos\theta - a_{M/B} \sin\theta - a_V \cos\theta. \quad \text{Equation (1)}$$

4. The device of claim 2, wherein the one or more equations comprise:

$$V = r_{Wheel}\omega = r_{Wheel}((a_c + a_{M/B}\sin\theta + a_V\cos\theta - g\cos\theta_{Grade}\cos\theta)/r)^{1/2}. \quad \text{Equation (2)}$$

5. The device of claim 2, wherein the one or more equations comprise:

$$\theta = \theta_0 + \omega t + \tfrac{1}{2}\alpha t^2. \quad \text{Equation (3)}$$

6. The device of claim 2, wherein the one or more equations comprise:

$$V = r_{Wheel}\omega = r_{Wheel}((a_{c1}+a_{c2})/(r_1+r_2))^{1/2}. \quad \text{Equation (4)}$$

7. The device of claim 2, wherein the one or more equations comprise:

$$a_t = \alpha r + g \cos\theta_{Grade} \sin\theta + a_{M/B}\cos\theta - a_V\sin\theta. \quad \text{Equation (5)}$$

8. The device of claim 2, wherein the one or more equations comprise:

$$\theta_{Grade} = \cos^{-1}(A\cos\theta + B)/(g(\sin\theta+\cos^2\theta)). \quad \text{Equation (6)}$$

where $$A = (r_2(a_{c1}+a_{t3}) - r_1(a_{c2}+a_{t1}+a_{t2}-a_{t3}))/(2(r_1+r_2)) \text{ and}$$

$$B = (r_2(a_{t1}-a_{c3}) - r_1(a_{t2}+a_{c3}-a_{c1}-a_{c2}))/(2(r_1+r_2)).$$

9. The device of claim 2, wherein the one or more equations comprise:

$$a_{M/B} = g\cos\theta_{Grade}\cos\theta - A, \quad \text{Equation (7)}$$

where $$A = (r_2(a_{c1}+a_{t3}) - r_1(a_{c2}+a_{t1}+a_{t2}-a_{t3}))/(2(r_1+r_2)).$$

10. The device of claim 2, wherein the one or more equations comprise:

$$\alpha = (a_{t1}+a_{t2})/(r_1+r_2) = (a_{t3}+a_{t4})/(r_1+r_2). \quad \text{Equation (8)}$$

11. The device of claim 2, wherein the one or more equations comprise:

$$\omega^2 = (a_{c1}+a_{c2})/(r_1+r_2) = (a_{c3}+a_{c4})/(r_1+r_2). \quad \text{Equation (9)}$$

12. The device of claim 2, wherein the one or more equations comprise:

$$a_{M/B} + g\sin\theta_{Grade} = r_{Wheel}\alpha. \quad \text{Equation (10)}$$

13. The device of claim 2, wherein the one or more equations comprise:

$$r_{Wheel} = (a_{M/B} + g\sin\theta_{Grade})/\alpha. \quad \text{Equation (11)}$$

14. The device of claim 2, wherein the one or more equations comprise:

$$d = \Sigma V \times \Delta t. \quad \text{Equation (12)}$$

15. The device of claim 2, wherein the one or more equations comprise:

$$d = n 2\pi r_{Wheel} + ((\theta-\theta_0)\pi r_{Wheel}/180). \quad \text{Equation (13)}$$

16. A standalone odometry device comprising:
    a plurality of dual-axis accelerometers, wherein the accelerometers define an array with a first accelerometer mounted at 0°, a second accelerometer mounted at 90°, a third accelerometer mounted at 180°, and a fourth accelerometer mounted at 270°;
    an inclinometer;
    a controller in communication with the accelerometers and the inclinometer, the controller being configured to receive data from the accelerometers and the inclinometer,
    wherein, with the odometry device mounted on a wheel of a vehicle, the controller processes the data from the accelerometers and the inclinometer to determine a parameter selected from the group consisting of acceleration due to motoring, deceleration due to braking, a self-calibrated wheel diameter, a grade of a surface with which the wheel is in contact, acceleration due to the grade, and deceleration due to the grade;
    a battery for powering the controller; and
    an output for communicating the parameter to an external position/speed computer.

* * * * *